United States Patent
Kuroda et al.

(10) Patent No.: US 7,609,400 B2
(45) Date of Patent: Oct. 27, 2009

(54) PROGRAM, RECORDING MEDIUM, INFORMATION PROCESSING APPARATUS, AND PRINTING DATA PROCESSING METHOD

(75) Inventors: Shigeki Kuroda, Kanagawa (JP); Hidekazu Morooka, Kanagawa (JP); Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 10/383,622

(22) Filed: Mar. 10, 2003

(65) Prior Publication Data

US 2003/0184787 A1 Oct. 2, 2003

(30) Foreign Application Priority Data

Mar. 12, 2002 (JP) ............................. 2002-067002
Feb. 28, 2003 (JP) ............................. 2003-052938

(51) Int. Cl.
*G06F 15/00* (2006.01)
*B41B 1/00* (2006.01)

(52) U.S. Cl. .................... 358/1.13; 358/1.14; 358/1.15; 358/1.1

(58) Field of Classification Search ................. 358/1.13
See application file for complete search history.

(56) References Cited

U.S. PATENT DOCUMENTS

| 5,287,194 | A | 2/1994 | Lobiondo | 358/296 |
|---|---|---|---|---|
| 5,793,938 | A | 8/1998 | Jackson, Jr. | 395/114 |
| 6,088,120 | A | 7/2000 | Shibusawa et al. | |
| 6,266,150 | B1 | 7/2001 | Brossman et al. | |
| 6,433,882 | B1 * | 8/2002 | Mori et al. | 358/1.13 |
| 6,950,203 | B1 | 9/2005 | Akabane et al. | |
| 7,023,579 | B2 * | 4/2006 | Toda | 358/1.9 |
| 7,046,385 | B2 * | 5/2006 | Mori et al. | 358/1.15 |
| 2002/0093681 | A1 * | 7/2002 | Hitaka | 358/1.15 |
| 2002/0163666 | A1 * | 11/2002 | Iwata et al. | 358/1.15 |

FOREIGN PATENT DOCUMENTS

| DE | 100 10 219 | 12/2000 |
|---|---|---|
| EP | 0 864 964 | 9/1998 |
| EP | 1 098 242 | 5/2001 |
| JP | 2000-19514 | * 7/2000 |
| JP | 2000-194514 | * 7/2000 |
| JP | 2001-216109 | * 8/2001 |
| JP | 2001-290623 | 10/2001 |
| JP | 2001-290626 | 10/2001 |

* cited by examiner

*Primary Examiner*—King Y Poon
*Assistant Examiner*—Pawandeep S Dhingra
(74) *Attorney, Agent, or Firm*—Fitzpatrick, Cella, Harper & Scinto

(57) ABSTRACT

Determination is made as to whether a request is made for printing by a printing job control system on the basis of a general-purpose printing file or a printing request from a general application is made. Ideal document management and output are thereby achieved.

7 Claims, 19 Drawing Sheets

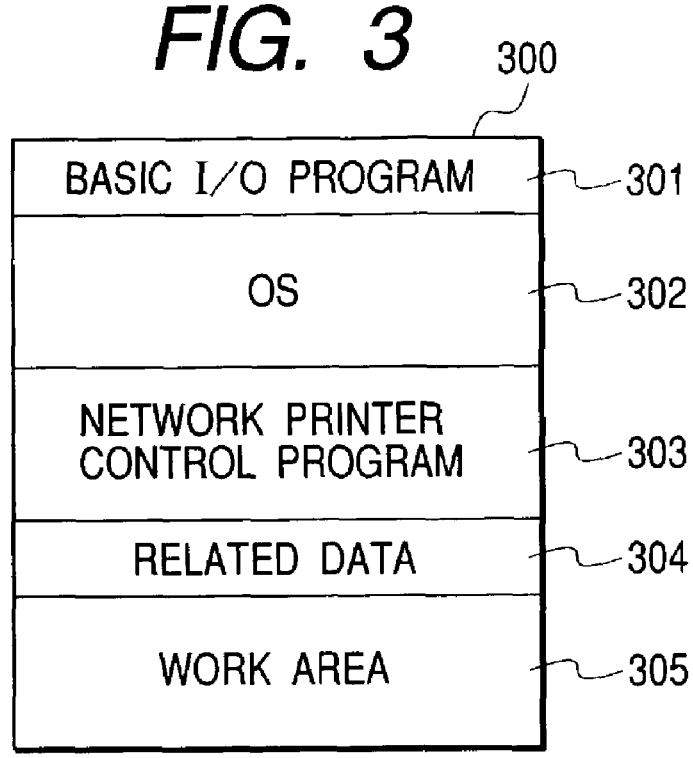
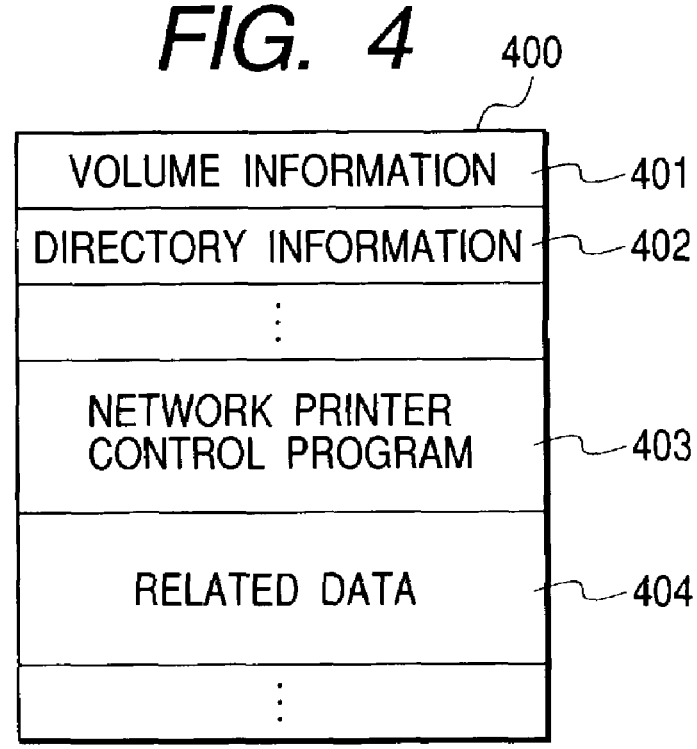

FIG. 9

| |
|---|
| JOB START |
| DOCUMENT DATA PORTION 1 IN GENERAL-PURPOSE FORMAT |
| DOCUMENT DATA PORTION 2 IN GENERAL-PURPOSE FORMAT |
| DOCUMENT DATA PORTION 3 IN GENERAL-PURPOSE FORMAT |
| . . . . . |
| PRINTING INSTRUCTION DATA PORTION |
| JOB END |

PAGE INFORMATION PORTION

PRINTING FORMAT DESIGNATION PORTION

OUTPUT METHOD DESIGNATION PORTION

PROGRAM, RECORDING MEDIUM, INFORMATION PROCESSING APPARATUS, AND PRINTING DATA PROCESSING METHOD

BACKGROUND OF THE INVENTION

1. Field of the Invention

The present invention relates to a program for printing control processing accompanied by reprinting processing which accompanies accumulation of documents, a recording medium on which the program is stored in a computer-readable state, an information processing apparatus and a printing data processing method.

2. Related Background Art

In recent years, network devices have come into general use. A multiplicity of such devices, e.g., a personal computers (hereinafter referred to as "PC") and printers are connected on a network. Techniques relating to reprinting in such a network environment are known.

For example, from a patent document 1 (Japanese Patent Application Laid-Open No. 2000-194514), a technique is known which comprises forming a virtual spool file through a virtual printer driver, making and storing a virtual document file based on the virtual spool file and providing an instruction to reprint the saved virtual document file. The technique disclosed in the patent document 1 also enables a virtual document file to be edited by predetermined editing processing using a virtual document editor, the results of editing being stored in a state of being contained in the virtual document file and reflected in a print at the time of reprinting.

From a patent document 2 (Japanese Patent Application Laid-Open No. 2001-216109), a technique is known which comprises storing in a server an Enhanced Meta-File (EMF) together with data a CAPCAL job description file (including Windows (trademark) job information, Devmode information and output control information) and executing reprinting on the basis of the stored EMF and CAPCAL job files.

However, conventional techniques in which an intermediate file is temporarily formed when print data processing such as distributed printing, substitute printing or the like with respect to a plurality of printer devices and in which a file is formed in a page description language corresponding to each device on the basis of the intermediate file when distributed printing or substitute printing is performed are incapable of management of information including output destination information in a case where document management is performed and data once printed out is printed after afterwards under a predetermined condition. It is supposed that management of information about an output destination is important particularly in document management associable with an output system for distributed printing or substitute printing. In a mode without managing output destination information, a user is required to perform a troublesome operation, e.g., setting of an output destination.

An editing system in which reprinting is performed after performing predetermined editing operations such as layout and output destination setting on printing data temporarily stored. However, there is still substantial room for improvement in such an editing system with respect to efficiently linking the editing system to a distributed printing or substitute printing output system to increase the processing speed of the system at the time of outputting printing results.

SUMMARY OF THE INVENTION

In view of the above-described circumstances, an object of the present invention is to realize a device for enabling an editing application and printing processing functions for substitute printing, distributed printing or broadcast printing with a plurality of printers to be efficiently associated with each other. The present invention provides a device having a printing control module for making each of a plurality of member printers perform printing processing on the basis of a general-purpose printing file containing document data and printing instruction information including a setting of a group printer having some of the plurality of member printers related thereto, wherein the contents of the document data can be changed according to an editing instruction for editing the document data through a first application; determination of whether to provide an instruction for printing the changed document data or to provide a printing instruction on the basis of a drawing instruction issued according to a printing instruction from a second application is made; each of the plurality of member printers is made to perform printing processing on the basis of the document data and printing instruction information corresponding the document data if provision of an instruction for printing from the document data is determined; document data is generated on the basis of the drawing instruction if provision of a printing instruction from the second application is determined; and each of the plurality of member printers is made to perform printing processing on the generated document data generated on the basis of the corresponding printing instruction information.

The present invention also provides a device for performing printing processing with respect to a plurality of printers, a general-purpose printing file being prepared from predetermined data, printing processing being performed by using the prepared general-purpose printing file, wherein a general-purpose printing file containing output destination information and print format information stored in a predetermined storage is read by a first application; first throwing-in into a printing job control system based on the general-purpose printing file read by the first application is performed according to a request for printing of the read general-purpose printing file; a general-purpose printing file is prepared on the basis of drawing instructions issued from an operating system according to data of a predetermined application according to a printing instruction from the application; second throwing-in of the general-purpose printing file prepared in said preparation step into the virtual printing control system is performed; and printing processing with respect to a plurality of printers is performed on the basis of the general-purpose printing file thrown in by the first throwing-in or by the second throwing-in.

BRIEF DESCRIPTION OF THE DRAWINGS

FIG. 3 is a diagram showing an example of a memory map of RAM 202 shown in FIG. 2;

FIG. 4 is a diagram showing an example of a memory map of FD 204 shown in FIG. 2;

FIG. 9 is a diagram schematically showing packetized data;

DESCRIPTION OF THE PREFERRED EMBODIMENTS

First Embodiment

A preferred embodiment of the present invention will be described below.

Figure 1:
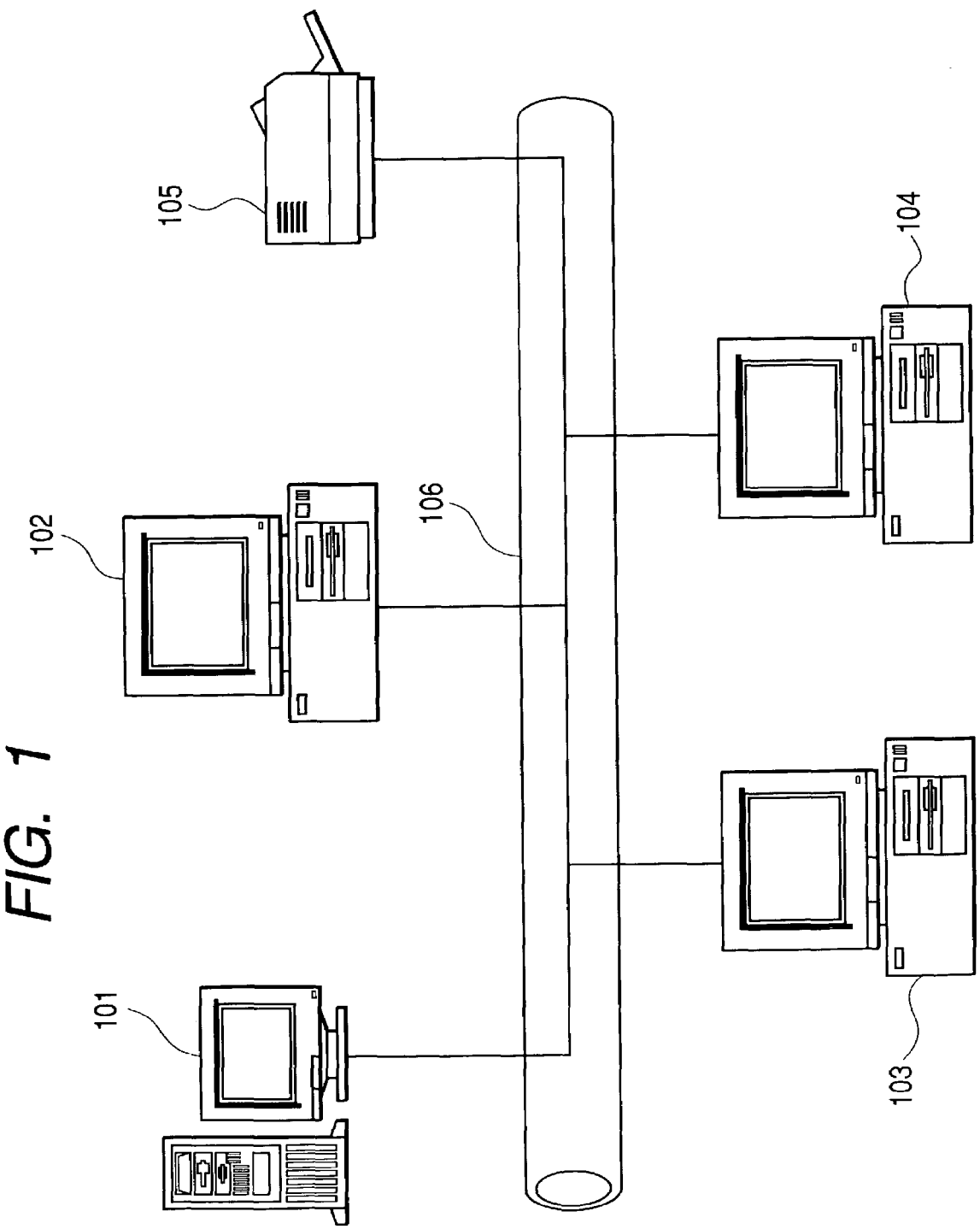
FIG. 1 is block diagram showing the configuration of an information processing system to which the present invention can be applied.

FIG. 1 is a block diagram outlining the configuration of an information processing system to which the present invention is applicable. This system is assumed to have one client computer or a plurality of client computers connected therein.

Referring to FIG. 1, information processing apparatuses 102, 103 and 104, which are client computers (clients), are connected to a network 106 by a network cable such as an Ethernet (trademark) cable, are each capable of executing various programs including application programs and have a printer driver having the function of converting printing data into a description in a printer language corresponding to a printer. The printer driver supports a plurality of printers.

An information processing apparatus 101 is a server (hereinafter referred to as "printing server") in this embodiment. The printing server 101 is connected to the network 106 by a network cable, accumulates files used in the network 106 and monitors the state of use of the network 106. The printing server 101 manages a plurality of printers connected to the network 106.

Each of the clients 102 to 104 and the printing server 101 is arranged as an ordinary information processing apparatus. Each client and the printing server have printing control programs for performing different kinds of control, the programs being stored in an executable state.

The printing server 101 in this embodiment further has the functions of printing by storing a printing job including printing data or receiving only job information including no printing data when a printing request is issued from the client computer 102, 103, or 104, managing the order of printing with respect to the client computers 102, 103 and 104, sending a transmission permission notice to one of the clients according to the printing order, obtaining information on the status of a network printer 105 and information on a printing job, notifying each of the client computers 102, 103 and 104 of such information, etc.

The network-enabled printer 105 is a printing control apparatus connected to the network 106 through a network interface (not shown). The network printer 105 analyzes a printing job which is transmitted from one of the client computers or the printing server and which includes printing data, converts the printing data into a dot image with respect to each of pages and prints images page by page. The network 106 connects the client computers 102, 103 and 104, the server 101, the network printer 105 so that communication can be performed therebetween. Needless to say, communication between them can be performed via a cable or in a wireless manner.

Figure 2:
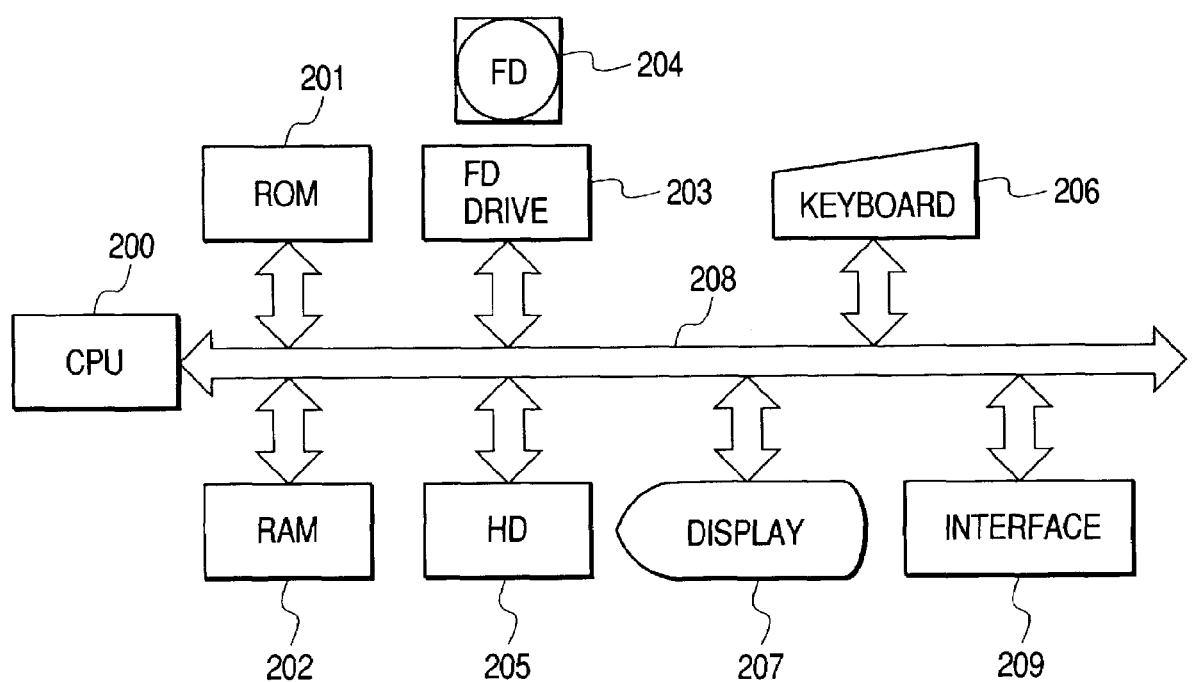
FIG. 2 is a block diagram showing the configuration of an information processing system in accordance with the present invention.

FIG. 2 is a block diagram showing the configuration of an information processing apparatus in accordance with the present invention. Each of the client computers 102, 103 and 104, which are information processing apparatuses, has the same configuration as that shown in FIG. 2. The server 101 has a hardware configuration which the same as or similar to that shown in FIG. 2. Therefore FIG. 2 will be referred to as a block diagram for the description of the configurations of the clients and the server.

Referring to FIG. 2, a central processing unit (CPU) 200 is provided as a control means in the information processing apparatus. The CPU 200 executes an application program, a printer driver program, an operating system (OS), a network printer control program in accordance with the present invention, etc., stored in a hard disk (HD) 205 and performs control processing for temporarily storing information, a file, etc., necessary for execution of a program in a random-access memory (RAM) 202.

A read-only memory (ROM) 201 provided as a storage means stores therein a program such as a basic I/O program and various sorts of data including font data used at the time of document processing and template data. The RAM 202 provided as a temporary storage means functions as a main memory, a work area or the like for the CPU 200.

A floppy (registered) disk (FD) drive 203 provided as a storage medium read means enables a program or the like stored on an FD 204 provided as a storage medium to be loaded therethrough into the main computer system, as described below with reference to FIG. 5. Any storage medium other than the FD, for example, a compact disk-read only memory (CD-ROM), a compact disk-recordable (CD-R), a compact disk-rewritable (CD-RW), a personal computer card (PC card), a digital versatile disk (DVD), an IC memory card, or a magneto-optical (MO) disk may be used.

The floppy disk (FD) 204 is provided as a storage medium on which a computer-readable program is stored.

The hard disk 205 is an external storage means functioning as a large-capacity memory. The hard disk 205 stores application programs, the above-mentioned printer driver program, OS and network printer control program, other related programs, etc. A spooler provided as a spooling means is held in this storage. In the client, the spooling means is a client spooler. In the printing server, the spooling means is a server spooler. A table for storing job information received from the clients to enable order control is also generated and stored in the external storage means in the printing server.

A keyboard 206 provided as an instruction input means in each client computer is operated by a user to input instructions including device control commands to the client computer. A keyboard 206 provided as an instruction input means in the printing server is operated by an operator or an administrator to input instructions including device control commands to the printing server.

A display 207 provided as a display means displays commands input through the keyboard 206, the status of the printer, etc.

A system bus 208 is provided in each of the client computers and the printing server computer to enable control of data flows in the computer.

An interface 209 is provided as an input/output means through which the information processing apparatus exchange data with an external device.

FIG. 3 is a diagram showing an example of a memory map in the RAM 202 shown in FIG. 2. In the memory map, the above-mentioned network printer control program loaded from the FD 204 into the RAM 202 and stored in an executable state is shown.

In the description of this embodiment, an example of direct loading of the network printer control program and related data from the FD 204 into the RAM 202 and execution of the program and data is described. Loading and execution of the network printer control program, however, may alternatively be such that each time the network printer control program is executed, it is loaded into the RAM 202 from the HD 205 in which it is installed in advance.

A CD-ROM, a CD-R, a PC card, a DVD, or an IC memory card other than the FD may be used as a medium on which the network printer control program is stored. Further, the network printer control program may be directly executed by the CPU 200 by being stored in the ROM 201 so as to form a portion of the memory map.

Pieces of software for realizing functions equivalent to the functions of the above-described devices may be provided as a substitute for the hardware devices.

The network printer control program may be referred to simply as a printing control program. The printing control program includes a program for performing control for designating a change of a printing destination of a printing job in one of the clients and designating a change of printing order, and also includes a program for notifying a printing end of a printing job and for making a printing destination change request. The printing control program for performing such control in accordance with the present invention may have modules separately installed respectively in one client and the printing server. Also, one printing control program may function for each client or the printing server according to the environment in the client or the printing server. Alternatively, both a module having the client function and a module functioning for the printing server may be installed in one computer to be simultaneously executed or made to perform pseudo parallel operations in a time-division manner.

In area 301 is stored a basic I/O program having an initial program loading (IPL) function for starting the operation of the OS read from the HD 205 to the RAM 202 when the power for the control apparatus is turned on, and other functions.

The OS is stored in area 302. The network printer control program is stored in area 303 secured on the RAM 202. Related data is stored in area 304 secured on the RAM 202. A work area 305 is secured as an area for execution of the printer control program by the CPU 200.

FIG. 4 is a diagram showing an example of the memory map in the FD 204 shown in FIG. 2. In FIG. 4, the contents of data in the FD 204 are indicated by 400, volume information indicating information on the data is indicated by 401, directory information is indicated by 402, the network printer control program which is the printing control program described with respect of this embodiment is indicated by 403 and data relating to this program is indicated by 404. The network printer control program indicated by 403 is a program described with reference to the flowchart with respect to this embodiment. In this embodiment, the network printer control program for the clients and that for the server are the same in construction.

Figure 5:
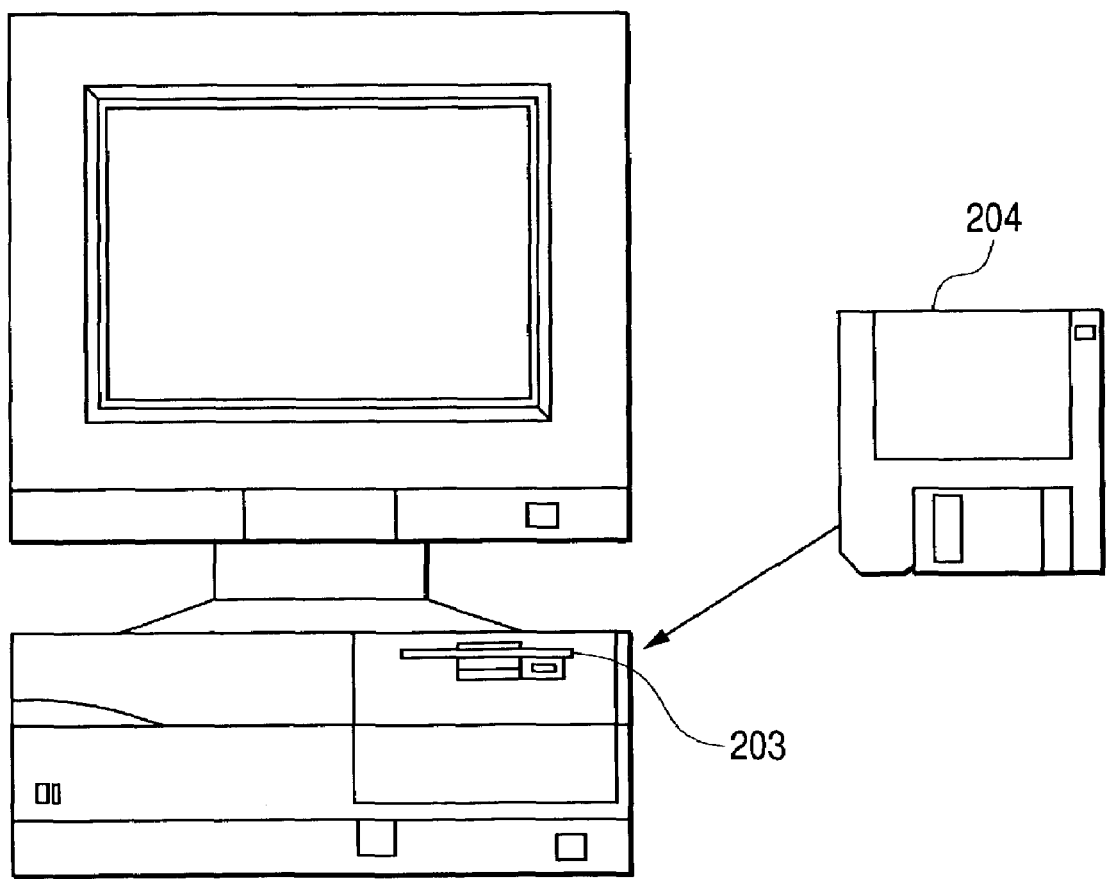
FIG. 5 is a diagram showing the relationship between FD drive 203 shown in FIG. 2 and FD 204 inserted in FD drive 203.

FIG. 5 is a diagram showing the relationship between the FD drive 203 shown in FIG. 2 and the FD 204 inserted in the FD drive 203. In FIG. 5, the same devices as those shown in FIG. 2 are indicated by the same reference characters. On the FD shown in FIG. 5, the network printer control program and data relating to the program, described below in the description of this embodiment, are stored in FD 204.

A printing job control system for performing printing processing for distributed printing processing, broadcast printing, or substitute printing by using a plurality of printers in this embodiment will now be described. This printing job control system is realized from processing in accordance with printing control module programs. Therefore the printing job control system can be replaced with printing modules. However, the printing job control system will be described by using terms specific to it.

Figure 6:
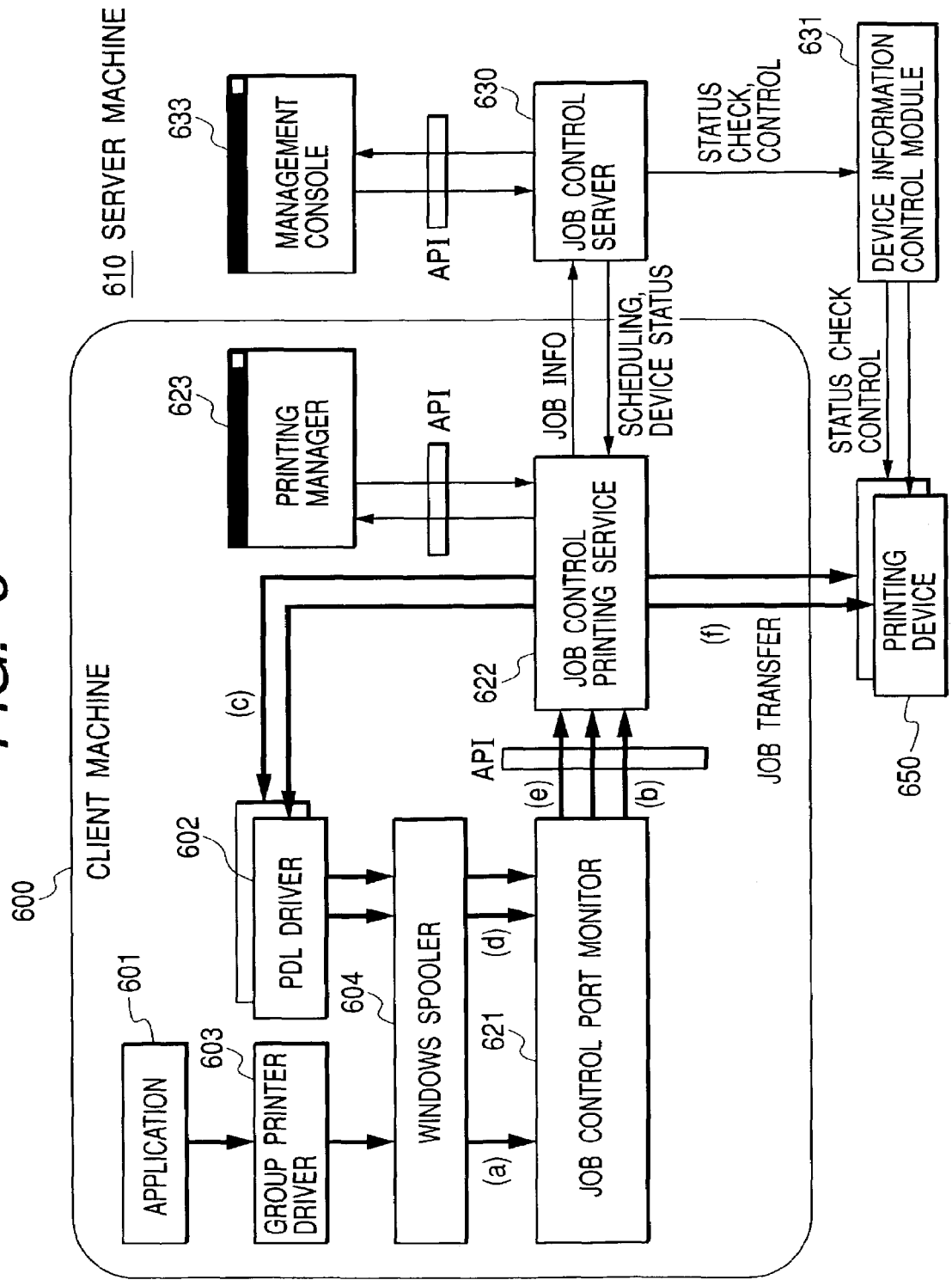
FIG. 6 is a block diagram showing the configuration of a printing control module of the information processing system of the present invention.

FIG. 6 is a diagram showing processing performed on a printing job issued from an ordinary application such as Microsoft Word (trademark) in the printing job control system. In FIG. 6, a client machine in which a client module in the printing job control system operates is indicated by 600.

Ordinarily, when a printing instruction is provided, the application program generates a sequence of drawing instructions, which is handed over to a Windows spooler via the printer driver. The Windows spooler uses a procedure for transmitting printing job data to a printer device by handing over the data to a port monitor selected by a user.

In this embodiment, a user provides an instruction to perform printing after designating a port monitor 621 for the printing job control system (referred to as "job control port monitor" with respect to this embodiment). If the input data is not one generated as a general-purpose printing file in advance, an application program 601 generates data for constructing a general-purpose printing file described below in detail with reference to FIG. 8. A case where data generated as a general-purpose printing file is thrown into a Window Spooler from the application 601 according to a printing instruction will be described below in detail (with reference to FIGS. 11 to 14). A group printer driver 603 receives the drawing instructions, generates document data in a general-purpose format (which may include data on characters, a figures, a photographic image and the like) and outputs the document data to a Windows spooler 604. The Windows spooler 604 transmits the received printing data as printing job data not to an ordinary port monitor but to the job control port monitor 621. The job control port monitor 621 transmits the printing job data not to a printer device 650 but to a printing service 622 for the printing job control system (hereinafter referred to as "job control printing service" with respect to this embodiment). The printing data is supplied as a job to the job control printing service 622 (*b*) via the job control port monitor 621 (*a*). The job control printing service 622 generates a general-purpose printing file with respect to this printing job, and generates drawing instructions through the OS on the basis of the general-purpose printing file (c). Page Description File (PDL) drivers 602 then form from the drawing instructions a PDL file interpretable by the printer device 650. In FIG. 6, an example of job control (distributed printing control) performed by the job control printing service 622 to divide a printing job into two is shown and two member jobs generated in such a manner are indicated by tow arrows (c). The PDL file formed by the PDL drivers 602 is again handed over to the job control printing service 622 (*e*) via the spooler 604 and the job control port monitor 621 (*d*). The job control printing service 622 transmits the PDL printing job data to the printing device 650 (*f*) according to a printing permission notice from a job control server 630. The job control printing service 622 logically divides one general-purpose printing file into a plurality of printing jobs according to a printing instruction description (corresponding to a printing instruction portion 10-*a*) in the generated general-purpose printing file and separately transmits the divided jobs to different printer devices. Alternatively, the job control printing service 622 transmits printing job data to one printing device and again transmits the same printing job data to another printing device. Lines (c), (d), (e) and (f) in FIG. 6 indicate routes for printing job data in such cases.

The technical meanings of terms used in the description of this embodiment are as described below. A virtual printer in which a plurality of printers are virtually combined into one is referred to as "group printer," and the combined printers are referred to as "member printers." Also, printer drivers corresponding to a group printer and member printers are referred to as "group printer driver" and "member printer driver," respectively.

Further, a group printer (group printer driver) and a member printer (member printer driver) are defined below. A virtual driver which generates data for forming a file in an intermediate format (general-purpose printing file) on the basis of drawing instructions generated from an application through the OS is referred to as "group printer driver." Each of printers provided with a printing instruction from the job control printing service 622 to generate a description in a page description language on the basis of the above-described intermediate-format file is referred to as "member printer."

On the other hand, a printer driver which interprets drawing instructions (ordinarily called DDI or GDI) output through the OS, e.g., Windows (trademark) according to a printing instruction in an application or a file in an Enhanced Metafile Format (EMF), thereby generates a description in a page description language, and outputs the generated description to a device is referred to as "ordinary printer driver" and discriminated from group and member printers. A combination of a printer driver and a printer output port may be referred to as a printer and discriminated from device printers. For example, designation of a combination of a logical port (job control port monitor 621) described below with reference to FIG. 7 and a group printer driver is referred to as designation of a group printer.

Referring again to FIG. 6, a printing manager 623 for the printing job control system (hereinafter referred to as "job control printing manager" with respect to this embodiment) is a program for providing a user interface (UI) through which the user examines the state of a printing job in the job control printing service 622 and operates the printing job. The job control printing manager 623 exchanges information and instructions with the job control printing service 622 through a software interface (API).

The server 630 for the printing job control system (hereinafter referred to as "job control server" with respect to this embodiment) performs centralized control (scheduling) on the job control printing service 622 on each client 600 with respect to timing of transmission of printing job data to the printer device 650.

A management console 633 for the printing job control system (hereinafter referred to as "job control management console" with respect to this embodiment) can monitors the entire printing job control system by exchanging information and instructions with the job control server 630 through an API for access by software provided in the job control server 630. The job control server 630 also obtains information about printing jobs in printers and the operating states of the printers and operates the printers by communicating with the printer devices 650 by using a device information control module 631. Information thereby obtained can be handed over to job control printing service 622 on the client 600 side.

The relationship between the Print System provided by Windows and a printing job in the printing job control system and processing in the systems will be described in more detail with reference to FIG. 7.

Figure 7:
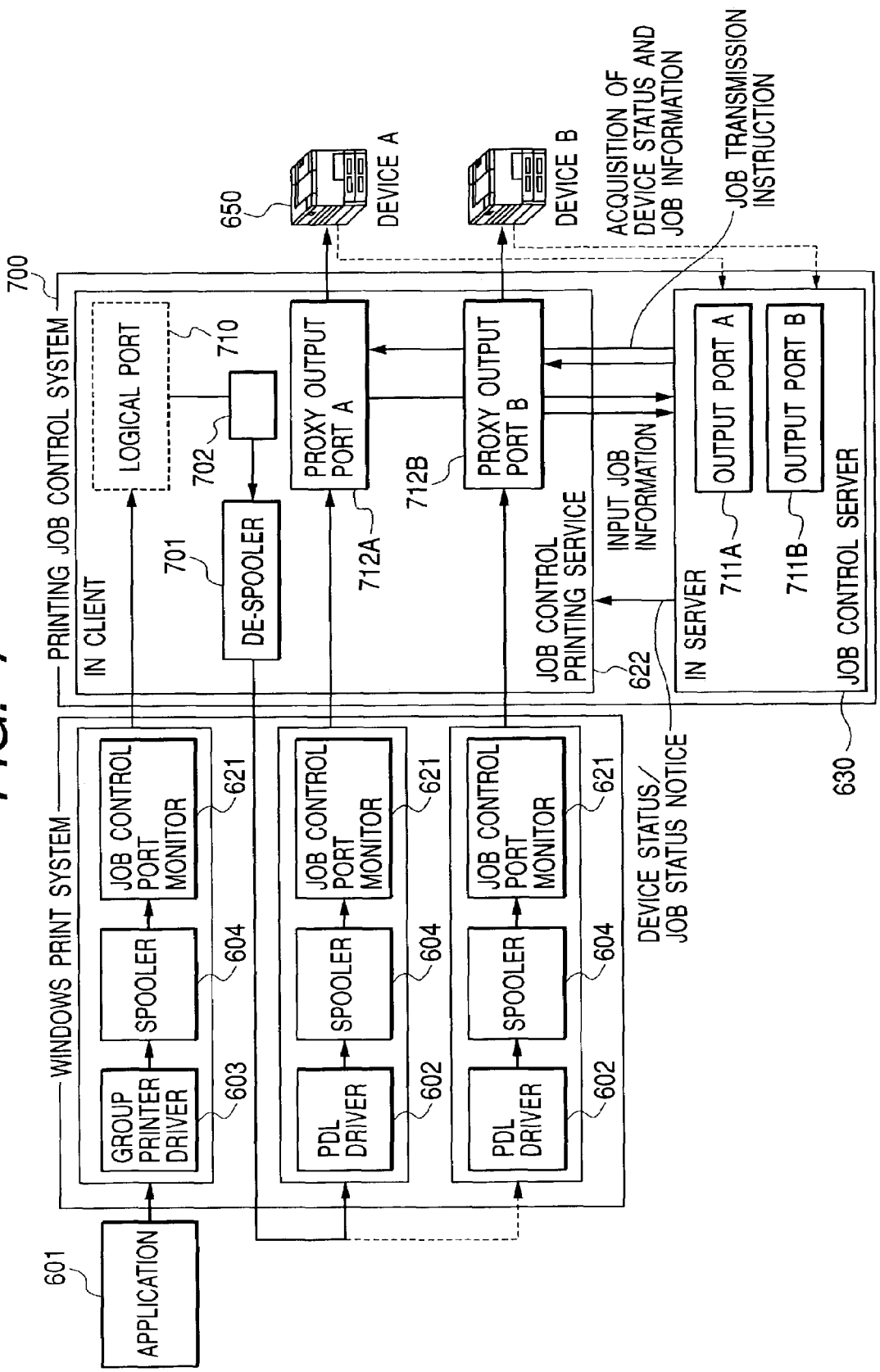
FIG. 7 is a diagram showing an example of the data structure of job information managed in a printing server.

The printing job control system indicated by 700 in FIG. 7 is shown as an area straddling the server and physical machines on which control programs in the server and one client operate. Output ports 711 managed by the server are related to proxy output ports 712 of the job control printing service 622 of the client. Through one output port of the server, the all related proxy ports on the client are integrally managed. In this embodiment, actual printing job data is held in the proxy output ports 712 of each client. The job control server 630 does not perform processing for immediate transmission of printing job data but only instructs the job control printing service 622 to transmit a printing job. According to the instruction, the job control printing service 622 transmits printing job data to the device 650.

Printing processing for substitute printing, distributed printing or broadcast printing in the printing job control system 700 using a plurality of printer will be described.

When value-added printing such as substitute printing, distributed printing or broadcast printing is performed in the printing job control system 700, it is necessary for the application 601 to issue a printing job to a printer assigned the group printer driver 603. The job control printing service 622 receives job data processed by the group printer driver 603 through the job control port monitor 621 as a sequence of job data items including document data in a general-purpose format and printing instruction information. A logical port 710 shown in FIG. 7 is a port for receiving such a job, into which a job is thrown. The job control printing service 622 receives packetized data received through the logical port 710 hands over the received data to a general-purpose printing file generation section 702. The general-purpose printing file generation section 702 executes processing for reconstructing the received data in the format of a general-purpose printing file 703 and writing the data as general-purpose printing file 703. Alternatively, the general-purpose printing file generation section 702 may be provided in a stage before the local port 710 to enable a reconstructed general-purpose printing file 703 to be read to a despooler 701 through the logical port 710.

The despooler 701 reads this general-purpose printing file 703 and issues a job (member job) to another printer (printer driver) assigned the PDL driver. At this time, the despooler 701 interprets the printing instruction portion 10-*a* of the general-purpose printing file described below in detail with reference to FIG. 10, processes document data in a document data portion 10-*b* on the basis of this interpretation, thereby converts the data into predetermined drawing instructions (corresponding to a GDI function in the case of Windows), and provides a printing instruction to each printer driver, thus issuing a printing job. For example, in the printing format instruction portion (see FIG. 10), in a case where a 2-UP instruction is recorded document data for two paces is laid out in a reduced state on one printing sheet. In a case where distributed printing or broadcast printing is recorded in an output method designation portion, jobs are issued to a plurality of member printers described in the printing instruction portion 10-*a* according to the setting. In the case of substitute printing, if it is determined that a condition for substitution is satisfied, a job is again issued to a substitute printer according to a setting of the substitute printer recorded in the printing instruction portion 10-*a* in advance in the case of automatic substitution and according to a user operation in the case of manual substitution.

It is also necessary for the despooler 701 to prepare a DEVMODE for each member printer as a printing instruction corresponding to the member driver at the time of issuing a job to the member printer. The DEVMODE for each member printer is formed so that contents described in the printing instruction portion 10-*a* are reflected therein as desired. A further description for the DEVMODE will be made. An ordinary printer-driver extracts basic setting information (e.g., the number of copies to be printed and information as to whether double-sided printing can be performed) necessary for ordinary printing processing from an area for driver setting information called a common area (public DEVMODE). Information set in this area is prescribed so as to enable read/write of set items regardless of printer vendors. On the other hand, functions specific to each printer, e.g., a stapling function, a punching function and a bookbinding function are stored in an extended area for driver setting information (extended DEVMODE). Setting information in this area is not uniform in format with respect to printer vendors.

The job control printing service 622 on the client side receives, through the job control port monitor 621, PDL data of member jobs rendered by the PDL drivers 602, notifies the server of information about the received jobs and temporarily holds the job data in its proxy output queue (proxy output port) 712. Thereafter, after receiving a transmission instruction from the job control server 630, the job control printing service 622 transmits the data to the printer device 650.

The description has been made with reference to FIGS. 6 and 7 by assuming that the job control server 630 controls transmission to a printing job to a printer device in such a manner that it issues a transmission permission to the client. However, a mode is also conceivable in which an IP address of each printer device is assigned to the corresponding member printer driver and printing data (PDL) is directly transmitted from the client. It is also conceivable that the application 601 and the block containing the group printer driver 603 (other than the block containing the PDL driver) shown in FIG. 7 are provided in clients while the functions of the other blocks are provided in a printer server provided physically separately from the clients. An additional description for the above-described group printer setting is made below. In this embodiment, a plurality of group printer drivers set in advance are held in such a form as to be selectable and usable. Setting of the group printer drivers involves at least setting for relating a plurality of member printers to group printer driver names, setting for relating corresponding output methods (distributed printing, substitute printing and so on) to the group printer drivers and setting of printing format setting information such as a default printing resolution, a printing sheet size and N-up layout. These settings are made through the user interface and the each set group printer is provided to the clients as a selectable candidate.

Processing in the group printer driver 603 to which ordinary drawing instructions (DDI: Device Driver Interface) are supplied from the application 601 through the OS will next be described.

Figure 8:
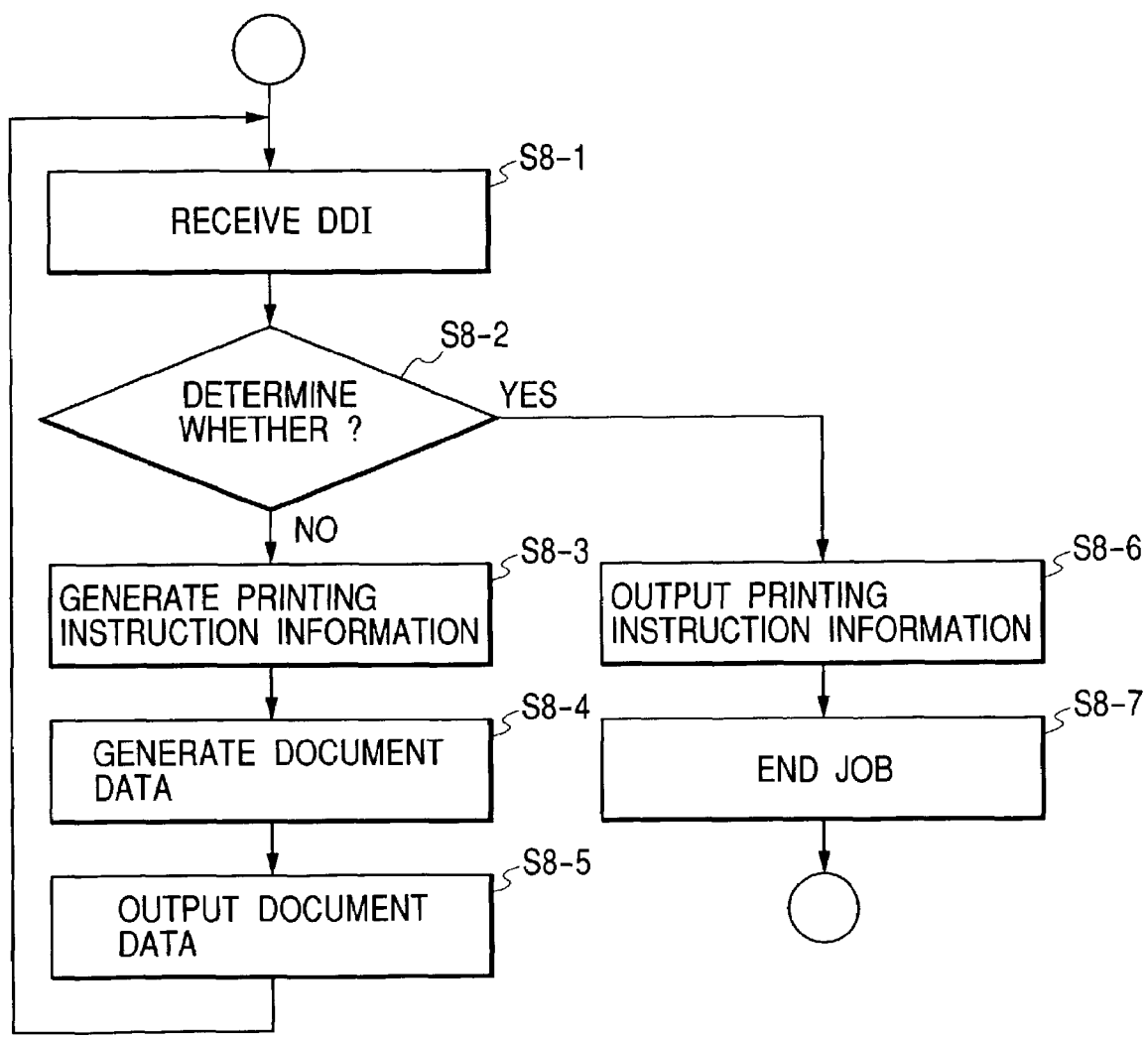
FIG. 8 is a flowchart of a process in which a group printer driver receives drawing instructions issued through the OS according to a printing request from application 601 and outputs data by spooler 604.

FIG. 8 is a flowchart showing a process in which the group printer driver 603 shown in FIGS. 6 and 7 receives drawing instructions issued from the application 601 through the OS and outputs data to the Windows spooler 604.

In step S8-1, a sequence of drawing commands DDI issued from the application 601 through the OS are received one after another.

In step S8-2, a determination is made as to whether the command received in step S8-1 is a command to end drawing.

If it is determined in step S8-2 that the received command is not a drawing end command, the process advances to step S8-3 and data in printing instruction information is read and generated from the command. The printing instruction information, referred to collectively as drawing commands, includes UI settings such as a printing sheet size, layout information and staple information.

Subsequently, in step S8-4, the drawing command received in step S8-1 is converted into document data in a general-purpose format. In this step, one document data item may be obtained with respect to one drawing command, or a group of drawing commands may be cached to be converted into one group of data.

In step S8-5, the document data in a general-purpose format generated in step S8-4 is packetized and output to the above-described Windows Spooler 604.

The process then returns to step S8-1 and an application drawing command is again received. If it is determined in step S8-2 that the received command is a drawing end command, the process advances to step S8-6 and the printing instruction information generated in step S8-3 is output.

The process then advances to step S8-7 and ends by issuing a job end instruction indicating the completion of output.

Figure 10:
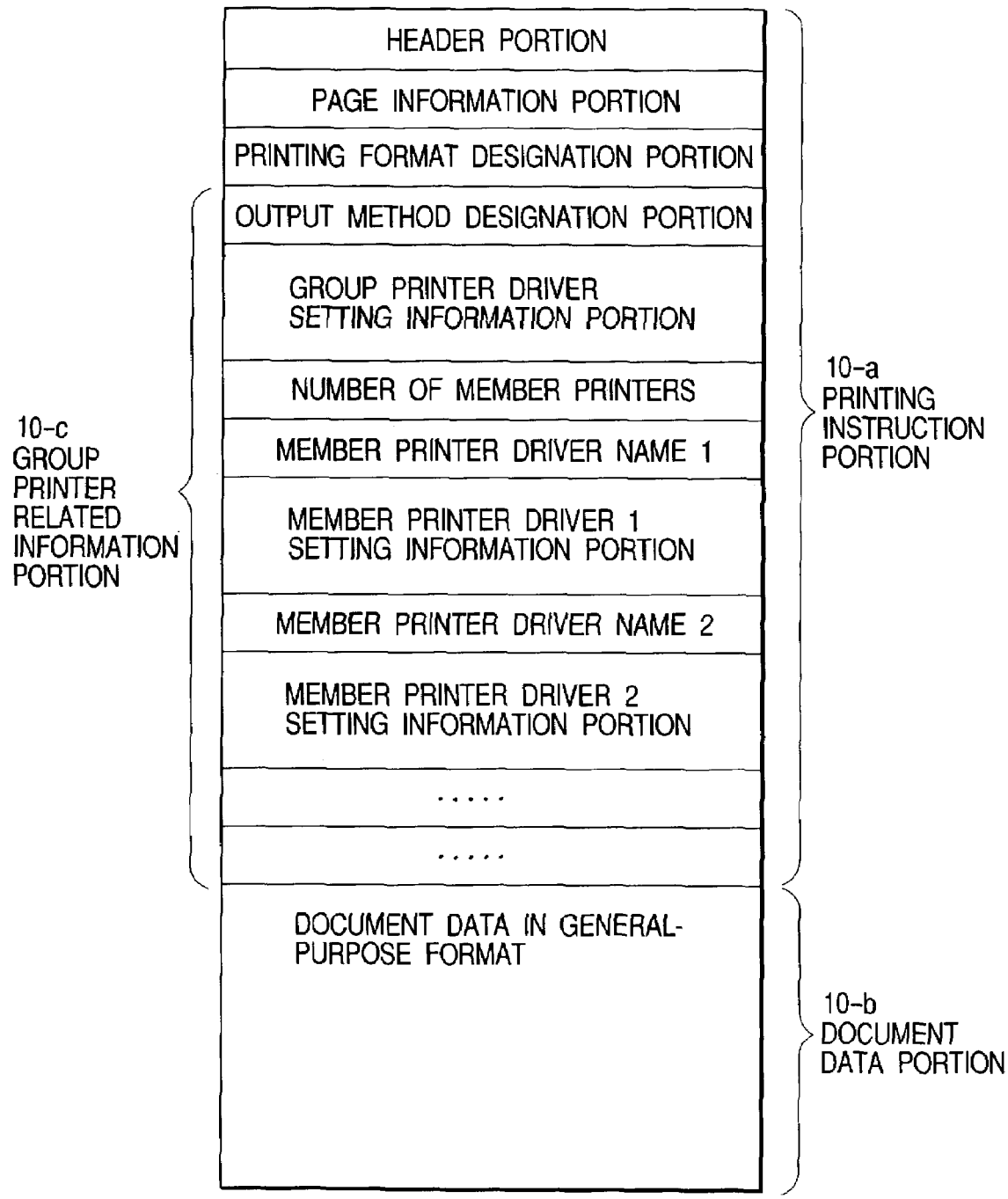
FIG. 10 is a diagram showing an example of the structure of a general-purpose printing file.

The process shown in the flowchart of FIG. 8 is thus executed to perform processing for packetizing drawing instructions and information including the printing sheet size as required, to output document data to the spooler 604 as required, ant to output printing instruction information (corresponding to data based on the printing instruction portion 10-*a* shown in FIG. 10) at a time after output of the document data. Data for forming a general-purpose printing file is thus formed by the group printer driver to reduce the load on the general-purpose printing file generation section 702 described above with reference to FIG. 7.

FIG. 9 schematically shows packetized data obtained as a sequence of data groups output as shown in FIG. 8.

First a sequence of output data groups is interposed between output packets: "Job Start" for a start of a job, and "Job End" for ending of the job. Document data portions 1, 2, 3 . . . in a general-purpose format shown in FIG. 9 represent a sequence of packetized data groups formed from document data in a general-purpose format which is output in the above-described step S8-5. The printing instruction data portion is shown as one packet in FIG. 9, but it may be transmitted by being divided into a plurality of packets, as is document data.

The output sequence of packetized data groups is supplied as a job from the Windows spooler 604 to the job control printing service 622 (*b*) via the job control port monitor 621 (*a*).

The job control printing service 622 constructs a general-purpose printing file from the transmitted data, generates drawing commands on the basis of general-purpose printing file (*c*), and each PDL driver 602 converts the drawing commands into a PDL file interpretable by the printer device 650.

FIG. 10 is a diagram showing an example of the construction of the above-described general-purpose printing file.

The general-purpose printing file used in this embodiment is constituted by a printing instruction portion 10-*a* and a document data portion 10-*b*.

The printing instruction portion is a portion in which document information and printing instructions are described, and which corresponds to information constructed (generated) on the basis of information output in steps S8-5 and S8-6 described above with reference to FIG. 8. Document data is data converted into a general-purpose format from document data produced by an application. This data format is independent of printer languages. Any format may be used as the format after conversion if it enables a detailed expression of an original on a page-by-page basis. For example, among substantially standard formats, the Enhanced Metafile Format (EMF) in the Windows system, the Portable Document Format (PDF) (trademark) in the Adobe system, or the SVG format may be adopted as a general-purpose printing document format.

The printing instruction portion is constituted by a header portion, a page information portion, a printing format designation portion, an output method designation portion, a group printer driver setting information portion, the number of member printers, member printer driver names and member printer driver setting information portions.

The header portion stores information such as version identification and file information of the file.

The page information portion is a portion for storing information including the number of pages of document data in the document data portion 8-*b* and the size of each page.

The printing format designation portion is a portion for storing information relating to an output format, such as a printing page area (margin), the number of copies to be printed, document data layout information (N-UP, bookbinding printing, etc.), stapling instruction and punching instruction.

The output method designation portion is a portion for storing information on an output method such as distributed printing, color/monochromic distributed printing, substitute printing, or broadcast printing.

The group printer driver setting information portion is a portion for storing setting information set through the setting UI of the group printer driver. A plurality of group printers may be defined with respect to output methods and combinations of member printers. One of the plurality of set group printers is selected by using a pointing device and is set to be contained in the group printer driver setting information portion in the printing instruction portion 10-*a*.

In the portion for the number of member printers, the number of member printers related by the group printer driver is stored.

In the portions for member printer driver names, printer driver names in the member printers are stored.

Each member printer driver setting information portion is a portion for storing, for example, DEVMODE information as setting information set through the driver UI corresponding to one of the member printers. Each output port and the device IP address are also contained in this portion. Setting information set through the driver UI is assumed to comprise setting information changed by opening the drive UI corresponding to one of the individual member printer drivers after a common printing setting with respect to the member printers has been made through the group printer driver UI.

The member printer driver name portions and the member printer driver setting information portions have the number of storage areas corresponding to the number stored as the number of member printers.

With respect to this file, it is also supposed that the printing instruction portion 10-*a* and the document data portion 10-*b* can be made usable as different files separable from each other. In such a case, it is possible that the printing instruction portion and the document data portion will exist as a printing instruction file and a document data file, respectively, and these two files will be treated as one file by being combined into data in an archive format.

Figure 11:
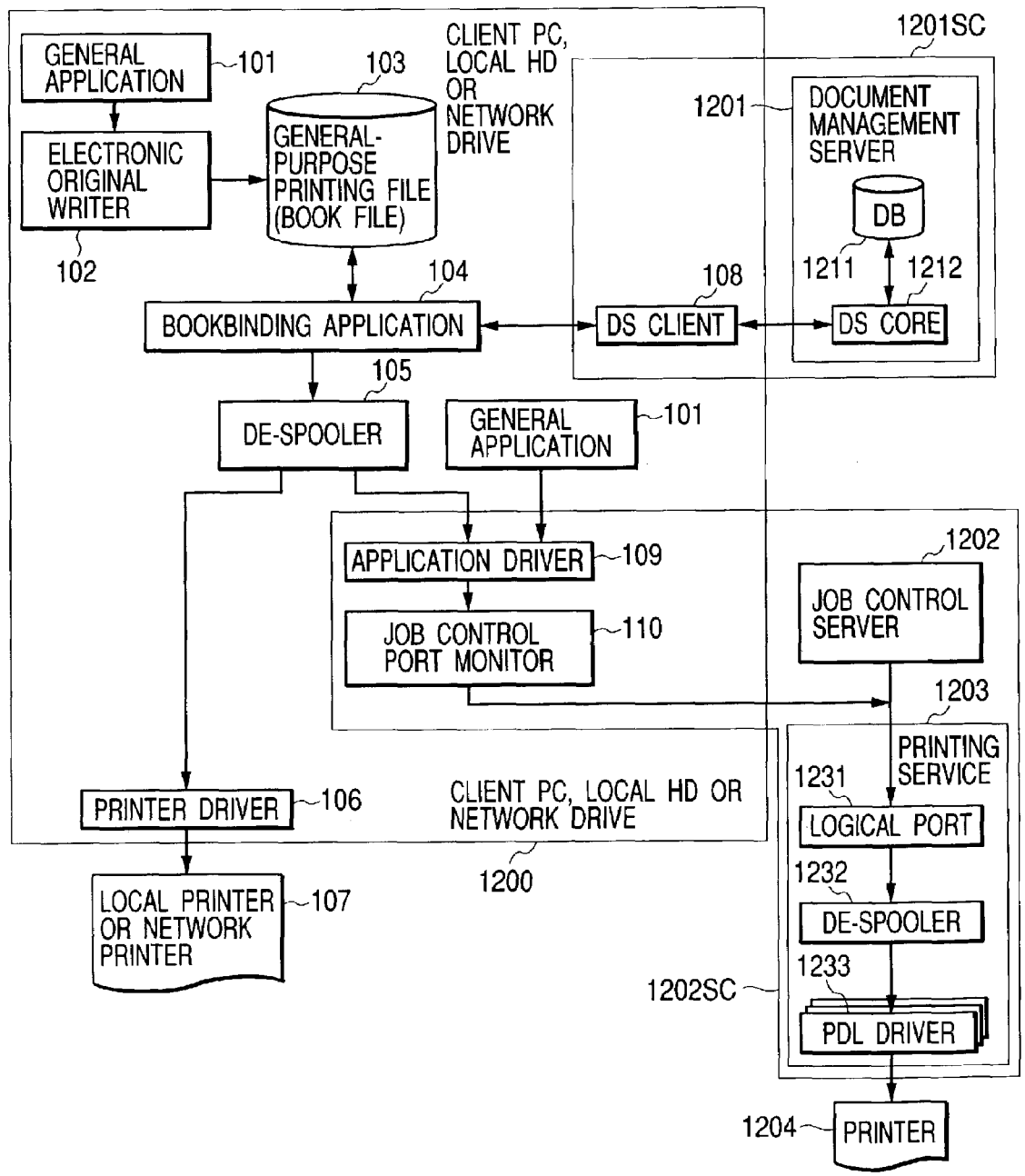
FIG. 11 is a block diagram of a client server type of document processing system.

FIG. 11 shows the software module configuration of a document processing system which includes at least the configurations shown in FIGS. 6 and 7, and which is suitably arranged as the information processing system of this embodiment.

General applications 101 are application programs which provide functions for word processing, spreadsheet processing, photo-retouching, drawing or painting, presentation, text editing, etc., and which have printing instruction functions for making the OS output drawing instructions. These applications use a predetermined interface (generally called a GDI) provided by the OS when printing prepared application data such as document data or image data. That is, each application 101 outputs output commands (drawing instructions called a GDI function) in a format dependent on the OS and determined in advance to an output module of the OS providing the above-mentioned interface.

The output module receiving the output commands converts the commands into a such format that the commands can be processed by an output device such as a printer. Formats processible by output devices differ from each other depending on the kinds of the devices, makers, models, etc. Therefore, device drivers are respectively provided for different output devices. The OS converts commands by using one of the device drivers to generate printing data, and generates a printing job by combining the printing data in a job language (JL).

A data format generated by an electronic original writer 102 will be described. The electronic original writer 102 is obtained by modifying the above-described device driver. The electronic original writer 102 is a software module provided to realize this document processing system. The electronic original writer 102, however, is not designed for a particular output device. The electronic original writer 102 converts output commands (general-purpose document data) into a format processible by a bookbinding application 104 and a group printer driver 603 (109) shown in the drawings.

Technical terms relating to the bookbinding application 104 in this embodiment are explained below. The bookbinding application 104 represents an application capable of reading the general-purpose printing file described above with reference to FIGS. 6 and 7. The bookbinding application 104 has functions for performing various kinds of editing processing, for example, for ordering pages and adding pages on the opened general-purpose printing file. The file contents on which editing required by the user have been performed are again stored in the general-purpose printing file format (as a file in the format shown in FIG. 10) to be reread or used for printing in this system.

The electronic original writer 102 has the functions of generating general-purpose document data, as does the group printer driver 603 described above with reference to FIG. 7. That is, the electronic original writer 102 has the same functions as those of the general-purpose printing file generation section 702. These functions of the electronic original writer 102 can be realized by using the same software modules as those for the group printer driver 603 and the general-purpose printing file generation section 702 described above with reference to FIGS. 6 and 7. Needless to say, the functions of the electronic original writer 102 may be separately provided.

The relationship between a file formed by using the electronic original writer 102 and a file formed by using the bookbinding application will next be described. In a case where the application 101 uses the electronic original writer 102, the electronic original writer 102 is designated as a device driver to be used for outputting and printing is thereafter executed. The electronic original writer 102 has the function of forming the general-purpose printing file readable by the bookbinding application 104 unlike ordinary printer drivers. With respect to processing for forming the general-purpose printing file, a mode in which both the document data portion 10-b and the printing instruction portion 10-a shown in FIG. 10 are made by the electronic original writer 102 or a mode in which the document data portion 10-b is made by the electronic original writer 102 while the printing instruction portion 10-a is made by a bookbinding application generated by the electronic original writer 102 is conceivable. Also, processing for forming one general-purpose printing file from the document data portion 10-b and the printing instruction portion 10-a formed in such a manner is realized by being executed by either of the electronic original writer 102 and the bookbinding application 104, as described below in detail with reference to FIG. 12.

By designating the electronic original writer 102 as a device driver and by making the general application 101 output data generated by the electronic original writer 102 as described above, application data is converted into general-purpose document data in units corresponding to pages defined by the application 101 (hereinafter referred to as "logical page" or "original page"). The generated general-purpose document data is stored as a general-purpose printing file 103 on a storage medium such as a hard disk.

The bookbinding application 104 provides the user with functions for reading the general-purpose printing file 103 and editing this file. The bookbinding application 104 provides functions for editing the structures of chapters and a book constructed by using minimum units corresponding to pages. In the bookbinding application 104, a file to which the structures of chapters and a book are added in this manner is included in the general-purpose printing file. However, the general-purpose file processed by the bookbinding application is discriminably referred to as a book file in this description.

A document management server 1201 is a server which stores a book file (general-purpose printing file) made and edited by the bookbinding application 104. Book files or general-purpose printing files are managed by the document management server 1201. Book files or general-purpose printing files are stored in a database 1211 (storage means) of the document management server 1201 provided in place of the local HD of client PCs. Storage and read of book files between the bookbinding application 104 and the document management server 1201 are performed through a DS client 108 and a DS core 1212. The bookbinding application enables each of stored general-purpose printing files to be designated through a predetermined user interface. The general-purpose printing file designated and opened by the bookbinding application is again used in reediting, reprinting or the like. At the time of reprinting or the like, since processing for generating the general-purpose printing file to be processed has been performed by the functions corresponding to the general-purpose document generation section 702, high-speed printing processing can be realized if the general-purpose printing file is thrown into the printing system according to printing instructions from the bookbinding application.

Figure 12:
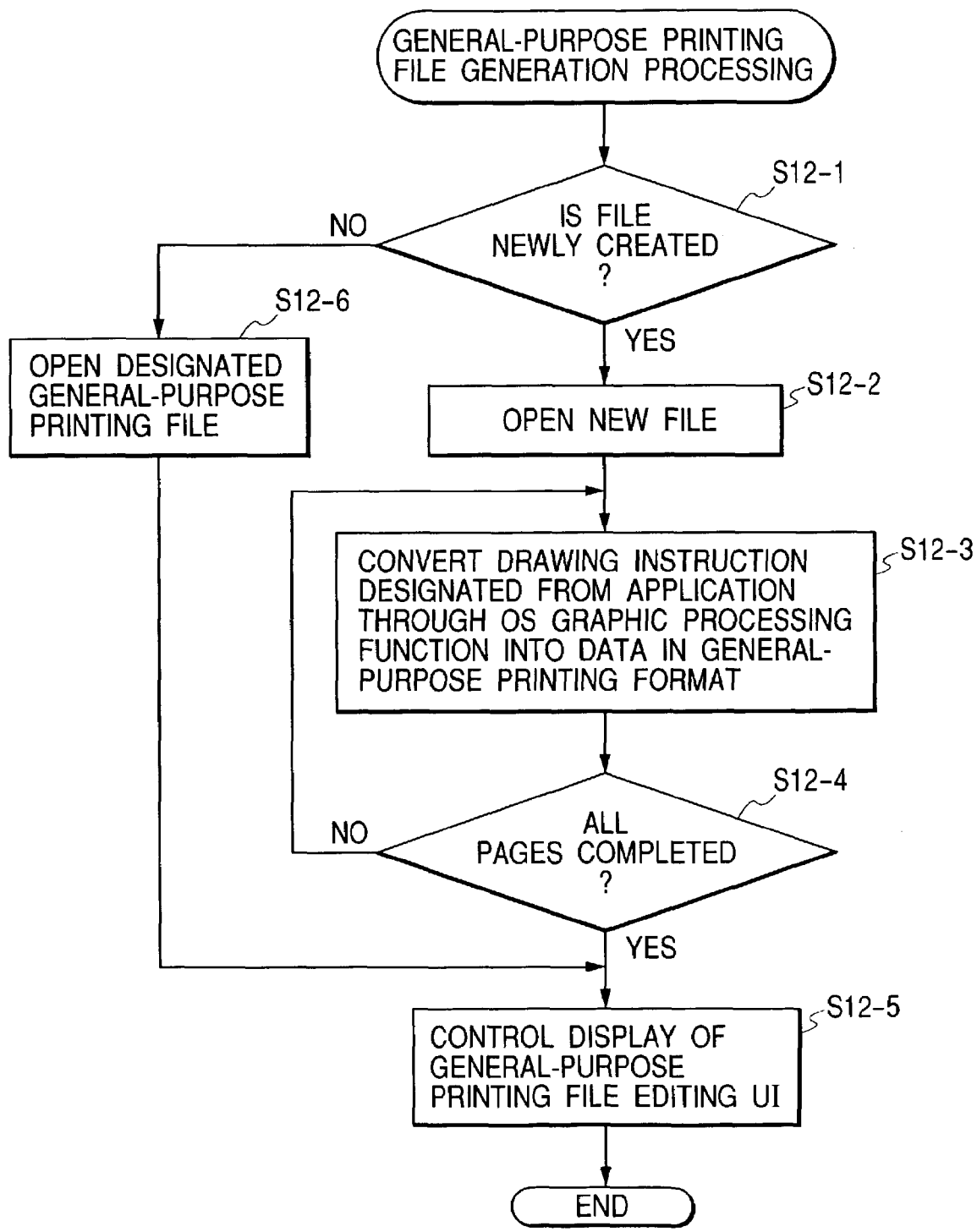
FIG. 12 is a flowchart showing processing operations when a general-purpose file is formed or opened.

FIG. 12 is a flowchart showing a procedure in which the bookbinding application 104 generates a general-purpose printing file on the basis of general application data by means of the electronic original writer 102 and displays an editing window for editing of a general-purpose printing file already generated. Needless to say, part of processing performed by the bookbinding application 104 may be executed by the despooler 105 and other software modules (objects) to realize the processing shown in the flowchart of FIG. 12.

First, in step S12-1, a determination is made as to whether an instruction to newly make a general-purpose printing file has been provided.

In step S12-2, if the result of determination in step S12-1 is "Yes," designated application data is identified and a file is opened and displayed on a display unit of the information processing apparatus.

In step S12-3, the electronic original writer 102 is designated as a device driver and made to output the application data. The application data is thereby converted into general-purpose document data. Step S12-3 may include processing for generating general-purpose document data (document data portion 10-b shown in FIG. 10) and for generating the default printing instruction portion 10-a. As details of the default printing instruction portion 10-a, the number of pages: one page in the page information portion, a printing sheet size: A4, a margin: 5 mm, the number of copies to be printed: one, layout information: 1UP, and staple/punch designation: none are conceivable. Needless to say, the default printing instruction portion 10-a is not limited to this example. It is desirable that default values most frequently used should be assigned to the items. As an output method, any of various output methods and a method of assigning a group printer and member printers as a default setting as required is conceivable. However, for the description of this embodiment made below, it is assumed here that no output method, no group printer and no member printers are assigned at this stage and no relating setting is made.

In step S12-4, a determination is made as to whether the file through all pages is completed. If it is determined that the file through all pages is completed, the generated general-purpose printing file is displayed on the display unit in a state of containing the default printing instruction portion 10-a.

If it is determined in step S12-1 that no instruction to newly make a general-purpose printing file has been provided, one of the existing general-purpose printing files is read from the above-described document management server 1201 shown in FIG. 11 and the user interface for editing the read general-purpose printing file (including the printing instruction portion 10-a and the document data portion 10-b) is displayed on the display unit in step S12-5. At this time, the printer (group printer) designated in the printing instruction portion 10-a of the read general-purpose printing file is set as a default printer to perform printing.

In other words, if the result of determination in step S12-1 is No, the general-purpose printing file designated through the user interface is opened and the identified file is displayed on the display unit in step 12-5.

The processing shown in the flowchart of FIG. 12 is executed as described above to enable data produced by a general application to be taken into the bookbinding application and to generate a general-purpose printing file used as an intermediate file in the printing system, thus enabling processing for generating a general-purpose printing file to be omitted when printing processing in the group printer driver shown in FIG. 11 is performed. In other words, in the case where a general-purpose printing file edited in the desired chapter construction/book construction by the bookbinding application is printed by the devised means shown in FIGS. 6, 7 and 11, high-speed printing processing (distributed printing, substitute printing or the like) can be realized.

When a general-purpose printing file is formed by means of the electronic original writer 102, not only processing for converting drawing instructions provided from an application through the OS into a general-purpose document data format but also processing for automatically generating as a default setting the printing instruction portion 10-a used for distributed printing, substitute printing or the like in this system is performed, thus solving the problem that no printing instruction portion 10-a exists and printing processing cannot be executed.

A description will next be described with reference to FIG. 13.

Figure 13:
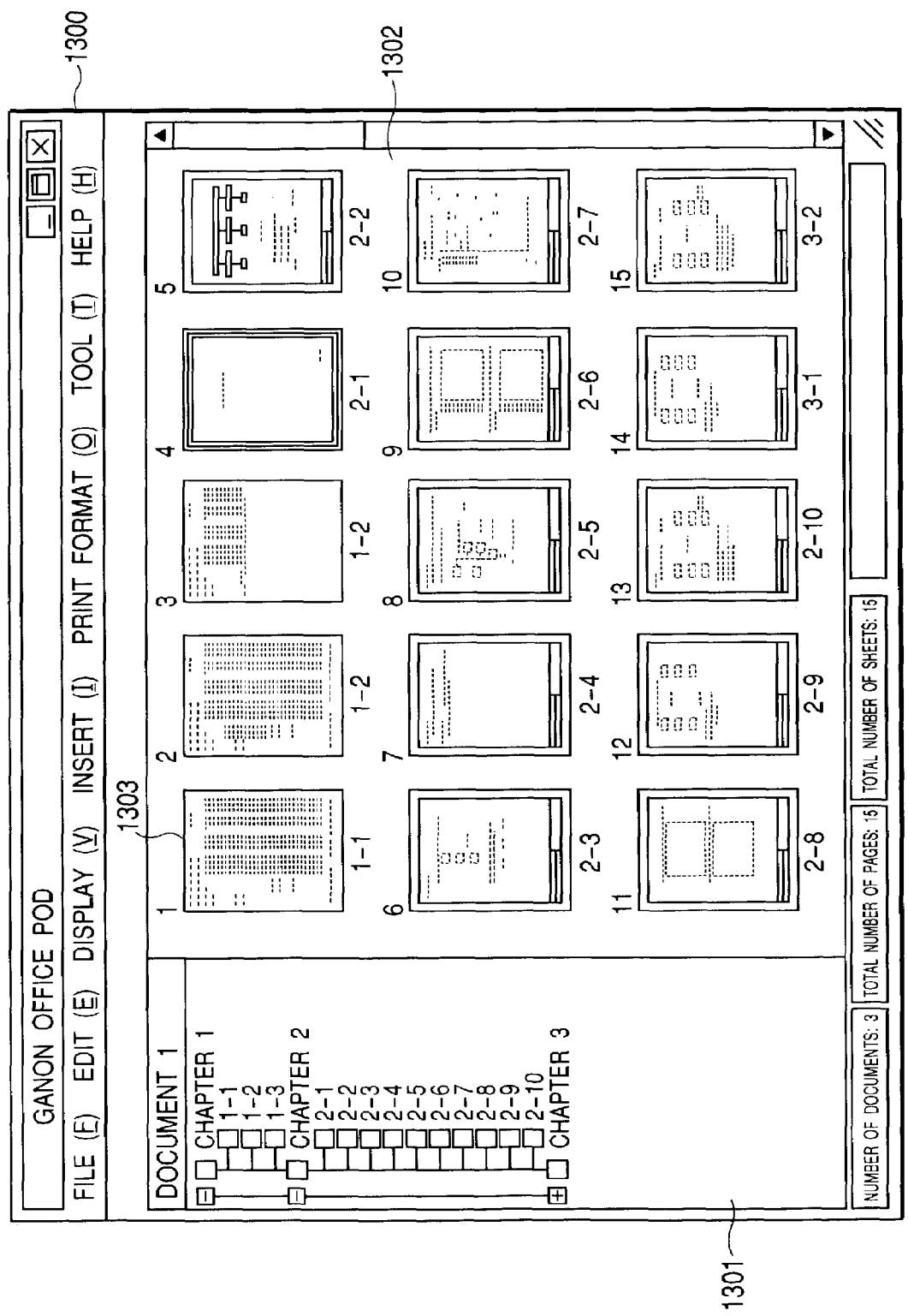
FIG. 13 is a diagram showing an example of a user interface window when a general-purpose printing file is opened.

FIG. 13 shows an example of the UI window displayed on the display unit by processing in step S12-5. A UI window 1100 includes a tree portion 1101 having a file tree structure and a preview potion 1102 in which a printed state is displayed. In the tree portion 1101, chapters contained in a file and pages contained in each chapter are shown in a tree structure. Pages shown in the tree portion 1101 are original pages. In the preview portion 1102, the contents on printed pages are displayed in a reduced state. In the order of display of the pages, the structure of the book is reflected.

To the opened general-purpose printing file, data converted into a general-purpose printing file by the electronic original writer as described with reference to the flowchart of FIG. 12 can be added as a new chapter. This function is referred to as an electronic original import function. This function is started by drug and drop operations on the application data on the window shown in FIG. 13 (corresponding to processing in the case of determination result Yes in S12-1).

The electronic impart function will be described in more detail. The application program that has generated designated application data is started and the electronic original writer 102 is designated as a device driver and made to output the application data, thereby converting the application data into general-purpose document data (corresponding to S12-2 and S12-4). An electronic original import is assumed to include the above-described default setting of the printing instruction portion 10-a.

After the completion of conversion, the general-purpose printing file generated in advance is added as a new chapter to the general-purpose printing file already opened. As chapter attributes, the values of attributes set in common with attributes of the general-purpose printing file are copied. Attributes other than the common attributes are set to prepared prescribed values.

If the application data before conversion is image data, no new chapter is added in principle but image data is added as a page in a chapter designated after conversion into general-purpose document data.

When a book file or general-purpose printing file 103 edited by the bookbinding application 104 as described above is printed, one of group printers 109 and ordinary printers is designated by the bookbinding application 104 through the electronic original despooler 105. The group printer driver 109 corresponds to the above-described group printer driver 603 shown in FIG. 7. A printing service 1203 and a despooler 1232 may be provided, for example, in correspondence with the above-described printing service 622 shown in FIG. 7 and the above-described despooler 701 shown in FIG. 7, respectively.

A procedure for performing printing processing from the bookbinding application through an ordinary printer driver different from the group printer driver will be described. The electronic original despooler 105 reads out a designated general-purpose printing file from the hard disk, generates output commands compatible with the above-described output module of the OS to enabling printing of each page in a format described in the book file and outputs the generated commands to the output module (not shown). At this time, a driver 106 of a printer 107 used as an output device is designated as a device driver. The output module converts the receive output commands into device commands interpretable and executable by the printer 107 by using the designated printer driver 106 of the printer 107. The device commands are then transmitted to the printer 107 and an image according to the commands is printed by the printer 107.

In a case where one of the group printers is designated as a printer, the electronic original despooler 105 performs such control that a designated general-purpose printing file is output to through an output port set in correspondence with the group printer driver, as described below in detail.

Various printing settings (printing instruction portion 10-a shown in FIG. 10) such as sheet size setting, N-up setting and staple setting can be designated through the printing setting window displayed in response to designation of "PRINT FORMAT (O)" in the user interface shown in FIG. 13. A general-purpose printing file is further formed by combining designated printing settings (also called a job ticket) and general-purpose document data.

Printing instructions are provided with respect to the formed general-purpose printing file. If at this time printing instructions are provided for the above-described logical port 710, printing control described above with reference to FIGS. 6 and 7 is performed.

If printing instructions with respect to the printer output port assigned a single output device (printing instructions using an ordinary printer) are provided, data in a page description language is transmitted to the device through the electronic original despooler 105, the OS (not shown) and the printer driver 106, as described above as shown in FIG. 11.

Processing at the time of printing instruction through the printing setting window displayed in response to menu designation for "PRINT FORMAT (O)" shown in FIG. 13 will next be described with reference to the example of the printing setting window displayed.

First, one of the printers (a combination of the printer driver and the printer output port) is selected through the printing setting window. If one of the group printers is selected, the printer output port corresponding to the group printer is indicated in the printing setting window. If the ordinary printer is selected, the printer output port corresponding to the ordinary output port is selected. That is, if one of the plurality of kinds of group printer is selected, the bookbinding application inquires of the selected group printer driver about various sorts of information, which include at least those described with respect to the printing instruction portion 10-a shown in FIG. 10, i.e., information relating to the group printer such as information on the kind of output method (substitute printing, distributed printing or the like) corresponding to the group printer, information on a single printer or a plurality of member printers related as a child printer, member printer driver names and information on the output ports of the member printers.

Replay information obtained by the bookbinding application from the group printer driver by the inquiry is written to the corresponding areas in the printing instruction portion 10-*a* by predetermined timing.

As the predetermined timing, a timing for writing the reply information to the printing instruction portion 10-*a* after temporarily storing the reply information in a memory, for example, in a case where a printing execution instruction is provided through the printing setting window displayed in response to menu designation for "PRINT FORMAT (O)" is conceivable.

If the printing sheet size, the resolution, or N-UP layout setting is changed through the printing setting window displayed in response to menu designation for "PRINT FORMAT (O)," the printing instruction portion 10-*a* is updated (rewritten) according to the change.

Figure 14:
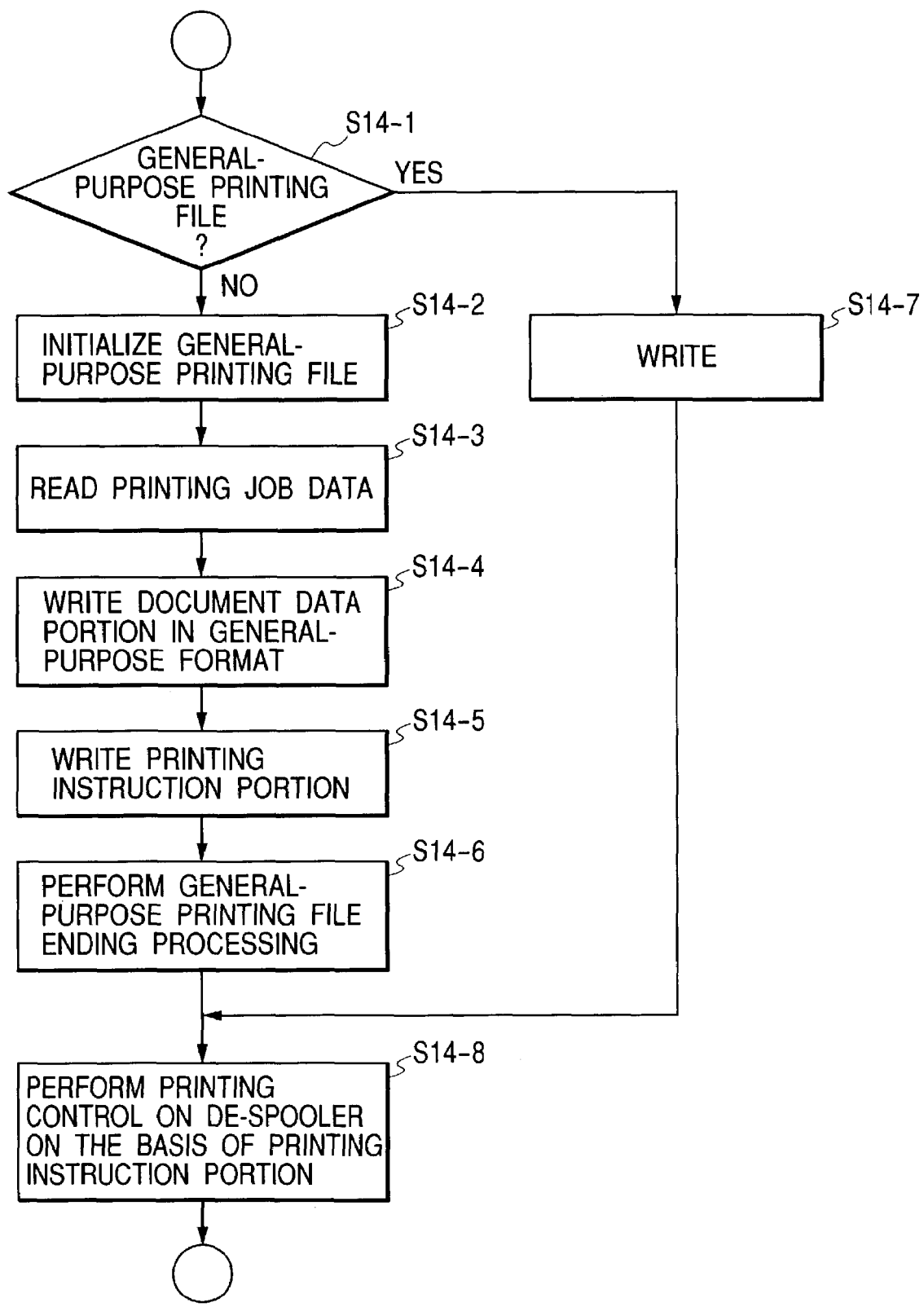
FIG. 14 is a flowchart showing processing operations accompanying generation of a general-purpose printing file by job control printing service 622.

When a printing execution instruction is provided through the printing setting window (FIGS. 18A and 18B) displayed in response to menu designation for "PRINT FORMAT (O)" or a window displayed in response to designation of "FILE (F)"→"PRINT (P)" with respect to the general-purpose printing file edited through the bookbinding application, the printing instruction portion 10-*a* and the document data portion 10-*b* set by the above-described devised means are handed over to the group printer driver 109 through the electronic original despooler 105 and printing instructions (instructions for forming data in a page description language or image data according to the printing settings) are provided by the despooler 1232 to the plurality of member-printers (member printer drivers) corresponding to the predetermined group printer selected through the job control port monitor 110 and the logical port. Groups of data respectively generated by the printer drivers to which the printing instructions have been provided are transmitted to the output devices via communication lines. Processing described below in detail with reference to the flowchart of FIG. 14 is executed according to a printing request with respect to the general-purpose printing file opened or edited in the bookbinding application 104.

In a case where printing instructions are provided with respect to a general-purpose printing file formed by the bookbinding application 104 as described above, the printing instruction portion 10-*a* including contents indicating an output method, a combination of member printers, etc., not set in advance, can be generated according to designation of the desired group printer made by the user. Therefore, it is possible to reliably and efficiently make printing settings for distributed printing or substitute printing using a plurality of printing devices even in a case where printing settings are made from an application such as a bookbinding application intended mainly to edit a general-purpose printing file.

With respect to a case where settings of a group printer are not yet set in the printing instruction portion 10-*a*, a mode in which a predetermined single printer driver set to be used in ordinary cases is employed or a mode in which an unset state is detected and settings of the group printer are then made is also conceivable from the viewpoint of reliably making printing settings for distributed printing or substitute printing from the bookbinding application.

A general-purpose printing file including the printing instruction portion 10-*a* updated by changing the group printer related information portion 10-*c* (output destination information) in the printing instruction portion 10-*a* set through the bookbinding application 104, by making a change in settings in the page information portion or the print format designation portion, or by adding or deleting general-purpose document data, as described above with reference to FIG. 11, is stored in a predetermined storage in the DB 1211 or the client. At the time of this storing, edited general-purpose document data 10-*b* is also stored as part of the general-purpose printing file.

Thus, the updated or changed document data can be stored as a general-purpose printing file in the DB 1211 or in the client while being related to group printer related information 10-*c*. If is, therefore, possible to realize devised document management means for performing printing processing for distributed printing, broadcast printing or substitute printing using a plurality of printers, which means are conveniently used with the printing job control system.

For example, it is supposed that a plurality of member printers is related to each of virtual printers (group printers), and there is a need to check the settings of member printers when one of the group printers is selected. In some cases, it is necessary to select member printers according to the contents of a document to be printed out. Also with respect to such a problem, troublesome user operations/efforts can be effectively reduced since general-purpose document data and the printing instruction portion 10-*a* are stored as a general-purpose printing file in a predetermined storage section.

Printing control processing in the job control printing service 622 relating to production and handling of a general-purpose file in this embodiment will be described with reference to FIG. 14.

FIG. 14 is a flowchart showing a process relating to the general-purpose printing file generation section 702 described above with reference to FIG. 7, in which process a general-purpose printing file 703 is formed. Part of processing in each step may be executed by a software module (object) to realize the processing shown in the flowchart of FIG. 14.

In step S14-1, a determination (branching) is made on the basis of general-purpose printing file identification information (information for identification of a general-purpose printing file) as to whether data, which will be received by the logical port 710, i.e., through the group printer driver 603, is a general-purpose printing file. For example, this branching is performed by the group printer driver 603. The existence of a general-purpose printing file at step S14-1 corresponds to a situation where a general-purpose printing file already formed by the above-described electronic original writer 102 or bookbinding application is received, in other words, a case where a printing request according to a general-purpose printing file opened by the bookbinding application 104 is made in the printing job system shown in FIGS. 6 and 7.

If it is determined in step S14-1 that the received data is a general-purpose printing file, the process advances to step S14-7 and the data in the same form as that when it is received is written as a general-purpose printing file. Then the process ends. The determination result Yes in step S14-1 occurs, for example, in a case where a general-purpose printing file including printing instruction portion 10-*a* and document data portion 10-*b* stored in the above-mentioned DB 1211 (storage means) is read or thrown into the printing job control system shown in FIGS. 6 or 7.

If it is determined in step S14-1 that the received data is not in a general-purpose printing file format, the process advances to step S14-2 and initialization for making a general-purpose printing file is performed. The determination result No in step S14-1 corresponds to a case where a printing request is sent from a general application to the printing job control system shown in FIGS. 6 or 7, and where there is a need to make a general-purpose printing file on the basis of drawing instructions issued from the OS according to application data accompanying this printing request, as described above with reference to FIG. 11.

Processing in step S14-1 may be performed in such a manner that throwing in a general-purpose printing file or not throwing in a general-purpose printing file is declared from a section from which data is thrown in, e.g., a bookbinding application or the OS and the group printer driver 603 or a predetermined determination module makes determination by recognizing the content of this declaration as information for identification of a general-purpose printing file.

In step S14-3, the received printing job data is read and deciphered to be constructed as a combined group of data. That is, the packetized document data portion in a general-purpose format shown in FIG. 9 is constructed as a combined general-purpose document data file and, if the printing instruction portion is received in a packetized state, the printing instruction portion is constructed as a combined printing instruction portion data file.

In step S14-5, the data is written as a general-purpose printing file.

In step S14-6, processing for completing the general-purpose printing file is performed and a procedure for making the despooler 701 described above with reference to FIG. 7 read and interpret the general-purpose printing file and other processing are performed. Then the process ends (step S14-8).

Thus, when the printing job control service 622 receives a general-purpose printing file already produced by a bookbinding application or the like in the process shown in the flowchart of FIG. 14, it can execute printing processing on the basis of the thrown-in general-purpose printing file without reconstructing the general-purpose printing file.

Thus, in this embodiment, in the printing system having the printing control module for making each of a plurality of printers perform printing processing on the basis of document data and printing instruction information including printing settings with respect to the plurality of printers, the contents of the document data can be changed according to document data editing instructions provided through a first application (bookbinding application 104); if the changed general-purpose document data is thrown as a printing job into the printing system, the printing system determines whether to provide instructions for printing the changed document data or to provide instructions for printing on the basis of drawing instructions issued according to printing instructions from a second application (general application) depending on the OS; in the case of determination to provide printing instructions from the first application, the printing system makes each of the plurality of member printers perform printing processing on the basis of the document data and the printing instruction information corresponding to the document data; and in the case of determination to provide printing instructions from the second application, the printing system generates document data on the basis of the transmitted drawing instructions and makes each of the plurality of member printers perform printing processing on the basis of printing instruction information corresponding to the generated document data. Thus, the editing application and the printing system are efficiently linked to increase the speed of the system at the time of outputting of a print. In other words, when a general-purpose printing file is received, it is possible to prevent an increase in processing time in the printing system due to an event in which opening/closing accompanying the construction of a general-purpose printing file occurs two times in the group printer driver and the general purpose printing file generation section.

Further, the contents of the above-described general-purpose printing file can be edited by using the above-described bookbinding application and the edited general-purpose printing file can be thrown into the printing system. In processing of data for printing using a plurality of printer devices, the system for distributed printing or substitute printing and editing techniques are efficiently linked in comparison with a system in which and editing file and a printing file are treated in different formats, thus realizing high-speed printing processing. The present invention is particularly advantageous in a case where a general-purpose printing file is stored to be used for reprinting.

In particular, means are devised to enable a general-purpose printing file used in the printing job control system for performing printing processing for distributed printing, broadcast printing or substitute printing using a plurality of printers to be edited or changed in settings by the bookbinding application 104 and thereafter stored, and to enable the stored general-purpose printing file to be thrown into the printing job control system, thereby ensuring that a user can use the high-speed printing job control system while changing the settings and contents of the general-purpose printing file according to user's need.

The printing job control system of the present invention is not limited to processing according to a printing request from the bookbinding application 104. It also enables printing processing shown in FIG. 6 or 7, accompanied by generation of a general-purpose printing file, to be performed according to a printing request from an application program such as a program for word processing, spreadsheet processing or photo-retouching different from the bookbinding application 104. That is, it is possible to realize efficient flexible printing processing such that a selection is suitably made according to the kind of an application making a printing request as to whether or not a general-purpose printing file is formed.

Second Embodiment

A second embodiment of the present invention will be described from the bookbinding application 104 with respect to details of processing performed when the output method for distributed printing, color/monochromic distributed printing, substitute printing or broadcast printing, described in the description of the first embodiment, is executed. It is assumed here that the printing system in the second embodiment also has the hardware configuration, the software modules (objects) and the processes described above with reference to the diagrams and the flowcharts of FIGS. 1 through 14. Points of difference from the first embodiments, in particular, will be described in detail.

Figure 15:
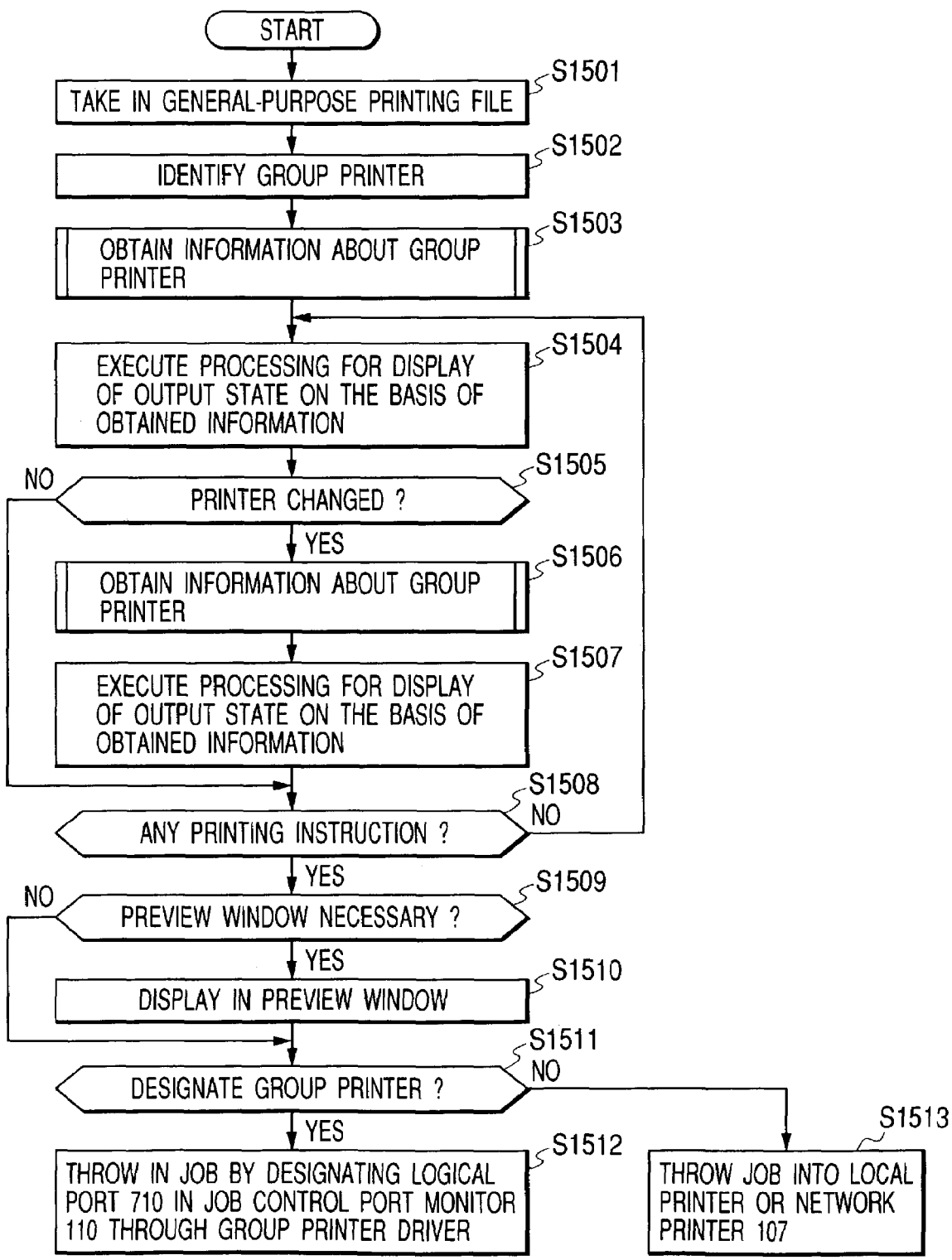
FIG. 15 is a flowchart showing processing operations by a bookbinding application.

FIG. 15 shows processing in a bookbinding application before processing of data for printing such as distributed printing, substitute printing or the like using a plurality of printer, such as that described in the description of the first embodiment, is performed. Processing in each step is executed under the command of the bookbinding application 104 shown in FIG. 12. Needless to say, part of processing performed by the bookbinding application 104 may be executed by software modules (objects), such as the despooler 105 or other to realize the processing shown in the flowchart of FIG. 15.

Processing in each step shown in FIG. 15 corresponds to that described in the description of the first embodiment. Steps S1501 to S1503 correspond to the description of the first embodiment with reference to FIGS. 12 and 13; steps S1505, S1506 and S1508 correspond to editing of a general-purpose printing file and change of various settings including output information (group printer) described with reference to FIG. 13; step S1511 corresponds to throwing of a general-purpose printing file from the bookbinding application shown in FIG. 13 into the printing job control system shown in FIGS. 6 or 7; and step S1512 corresponds to processing in FIG. 14.

Figure 16A:
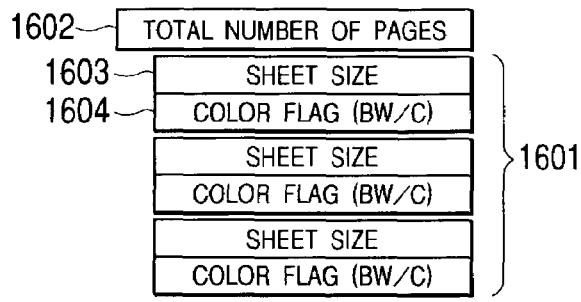
FIGS. 16A, 16B and 16C are diagrams showing details of printing instruction portion 10-a obtained by the bookbinding application.
Figure 16B:
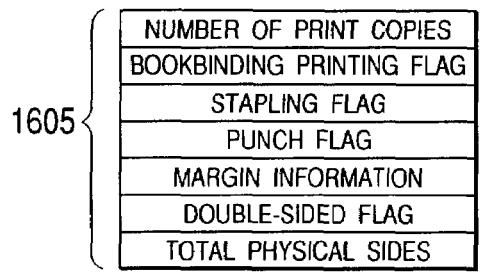

First, in step S1501, processing is performed by the bookbinding application 104 to take in a general-purpose printing file. Taking-in in step S1501 corresponds to processing in each of the step executed in the case of the determination result Yes in step S12-1 in FIG. 12 described in the description of the first embodiment and the step executed in the case of the determination result No in step S12-1. Taking-in processing in step S1501 includes processing for making/reading the header portion, the page information portion, the print format designation portion and so on in the printing instruction portion 10-a shown in FIG. 10. FIGS. 16A and 16B show details of the page information portion and the print format designation portion, in particular.

The corresponding relationship with FIG. 12 will be described in more detail. As described above with respect to step S12-1, a default printing instruction portion 10-a is newly made. The bookbinding application performs display on the basis of the default printing instruction portion 10-a made in step S12-1. A page information portion may also be made on the basis of drawing instructions with respect to application data converted into a general-purpose file and setting information such as a page setting/a printing setting/a set number of pages. "Default" referred to herein denotes a setting uniquely determined in advance by the bookbinding application or a default setting based on a selection made by a user from prepared layout templates. A desired template may be selected in the window 1805 of FIG. 18B.

If the result of determination in step S12-1 is No, display by the bookbinding application from the printing instruction portion 10-a and the document data portion 10-b incorporated in the general-purpose printing file is performed.

Referring again to FIG. 15, in the next step S1502, a group printer is identified. This identification is made on the basis of group printer identification information newly set in step S1501 or set in advance. If a group printer is newly set, setting is performed by inputting through setting windows shown in FIGS. 18A and 18B, for example.

Group identification information may be contained, for example, in the group printer driver setting information portion shown in FIG. 10. As this printer identification information, a printer name or a printer ID, for example, may be used and any other sort of information may be used if it enables identification of a printer.

Figure 18A:
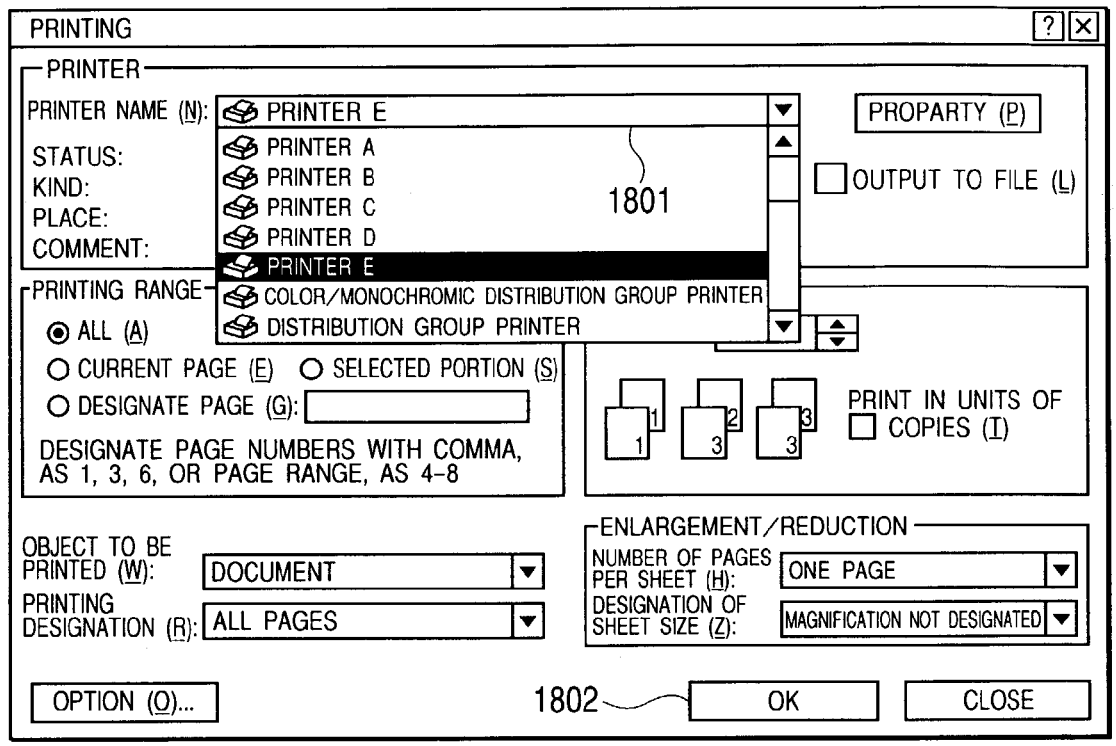
FIGS. 18A and 18B are diagrams showing printer selection windows.
Figure 18B:
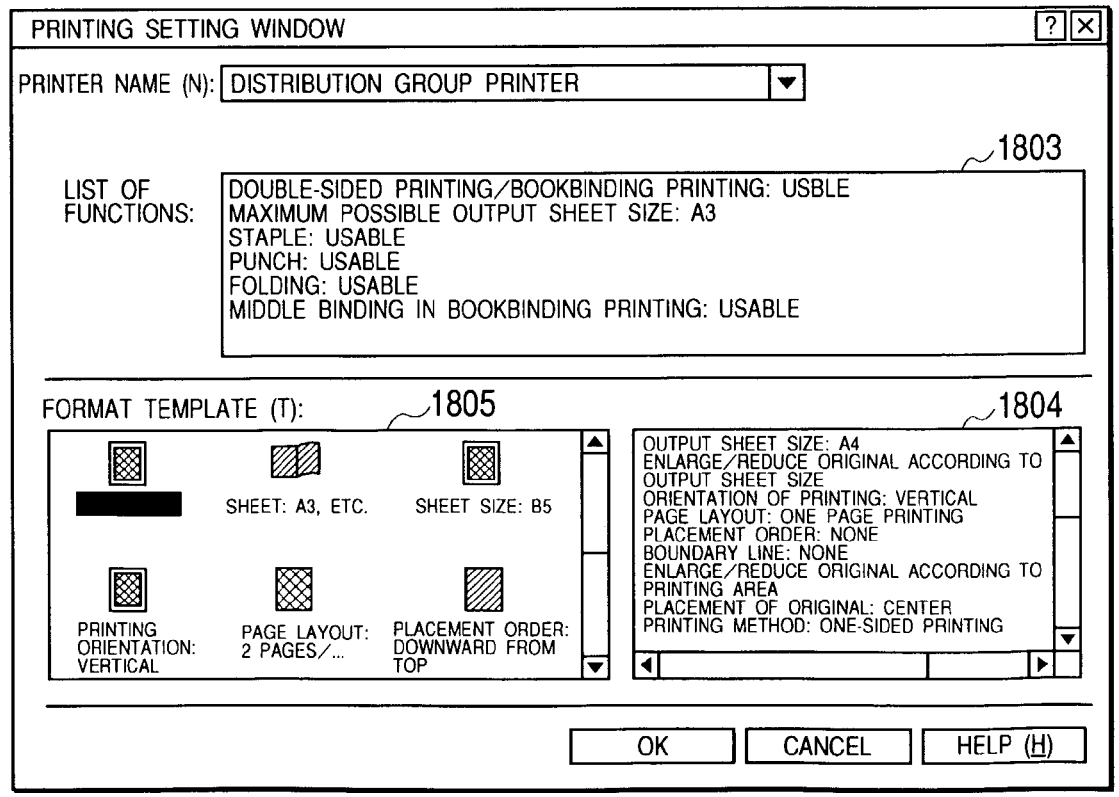

Alternatively, a printer selection window such as shown in FIGS. 18A and 18B may be displayed and a predetermined printer may be selected from information displayed in the selection windows. Printers registered in a printer holder set in the system (OS) are contained in the printer selection windows. The registered printers may include a plurality of group printers defined in correspondence with output methods/combinations of member printers, member printers constituting each group printer and printers registered in other OSs. The above-described printer identification information is set in the printing instruction setting portion 10-a.

As long as the printer (output destination information) identified in step S1502 is not changed, it is used as a default setting for printing processing in step S1508. This printer comprises a group printer. This default setting is different from "Printer ordinarily used" set in the printer holder of the OS and is independently prepared in each of general-purpose printing files.

Since the output destination information (group printer setting information) set in the printing instruction portion 10-a in an existing general-purpose printing file is used as a default setting particularly when the general-purpose printing file is read, smooth printer setting processing can be realized regardless of the setting of "Printer ordinarily used" registered in the OS operating on the information processing apparatus to be used as a default printer. Once a group printer is related to a predetermined general-purpose printing file, the group printer meeting a user's demand can easily be used when the corresponding general-purpose printing file is printed out.

In step S1503, group printer related information is obtained on the basis of the group information identification information referred to in step S1502. The group information identification information is formed as shown in FIG. 10. At this time, the group printer related information 10-c (printing instruction portion 10-a) containing virtual printer output destination information is updated, as described above.

Figure 19:
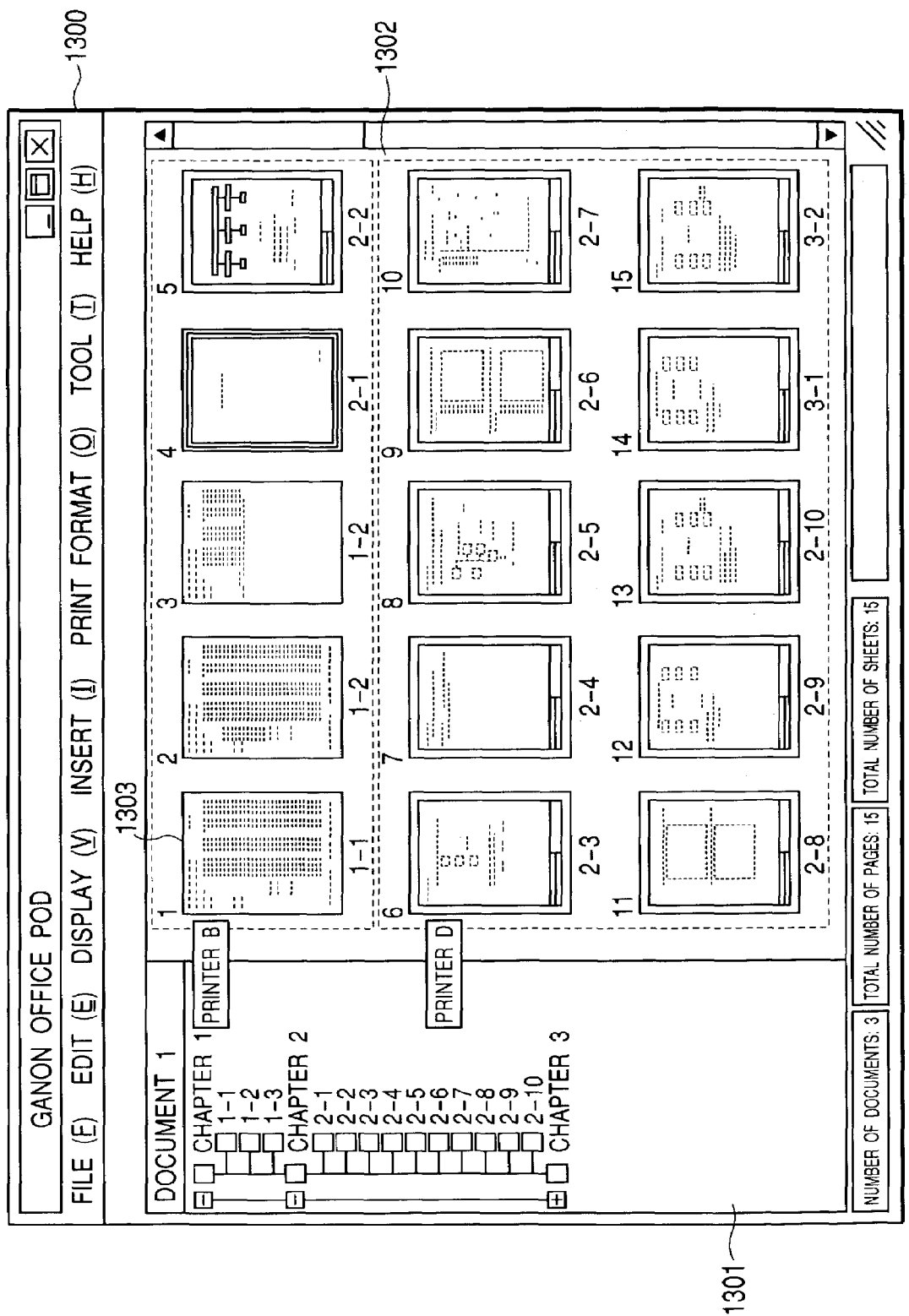
FIG. 19 is a diagram showing an example of a user interface window when a group printer is designated as a general-purpose printing file output destination according to a distributed output method.

In step S1504, output conditions are displayed on the basis of the information obtained by processing in step S1503. The output conditions include a distributed condition in a case where distributed printing or color/monochromic distributed printing is performed. For example, if the group printer output method identified in step S1502 is "distributed printing," the state of display made in step S1504 is as shown in FIG. 19. Thus, by processing in step S1504, the output conditions according to the group printer settings can be reflected in the editing window of the editing application (bookbinding application 104), thereby enabling the user to visually understandably recognize the output conditions of a plurality of printers while editing the general-purpose printing file.

In step S1505, a determination is made as to whether the printer has been changed. The printer is changed by an arbitrary timing input made through the setting windows shown in FIGS. 18A and 18B. Also at this time, the group printer related information 10-c (printing instruction portion 10-a) including virtual printer output destination information is updated, as in step S1503.

If the result of determination in step S1505 is Yes, group printer related information is again obtained in step S1506. The same processing as that in step S1503 is performed.

Figure 20:
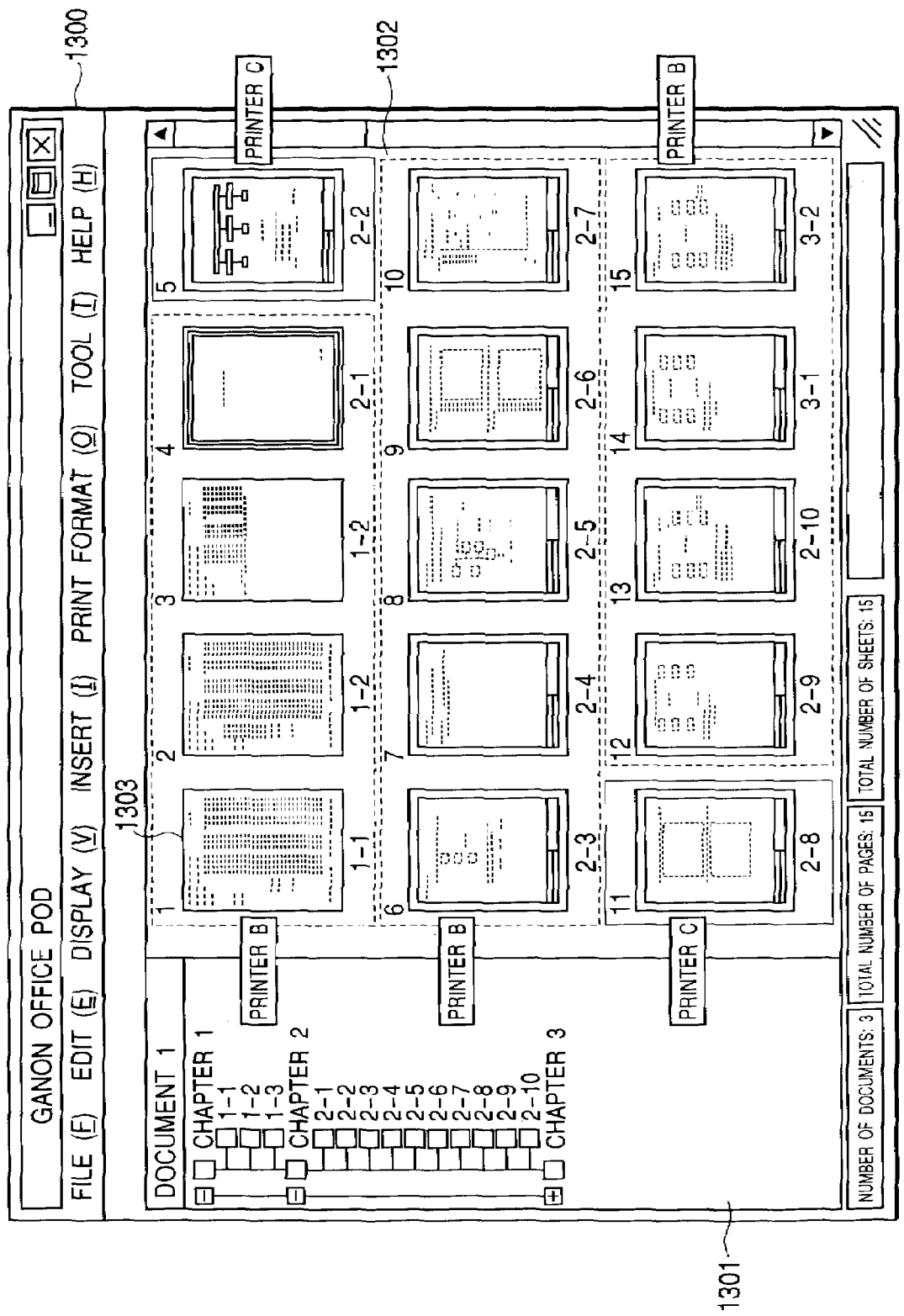
FIG. 20 is a diagram showing an example of a user interface window when a group printer is designated as a general-purpose printing file output destination according to a color/monochromic distributed output method.

In step S1507, the same processing as that in step S1504 is performed. For example, if the output method is changed from a group printer for distributed printing to a group printer for color/monochromic distributed printing, the state of display shown in FIG. 19 is changed to a state such as shown in FIG. 20.

In step S1508, a determination is made as to whether a printing instruction has been input. For example, a printing instruction is input by pressing a button 1802 shown in FIG. 18A.

In response to input of a printing instruction, a determination is made in step S1509 as to whether a preview window should be displayed.

It is determined that there is a need for a preview window upon performing processing in step S1508, for example, in a case where the printer has been changed through the setting windows shown in FIGS. 18A and 18B. Then, in step S1510, the same display processing as that in steps S1504 and S1507 is performed. If the printer has been changed, processing for updating the group printer related information 10-c (printing instruction portion 10-a) including virtual printer output destination information is performed in step S1508, as is that in step S1503.

When processing in step S1510 is performed, the same processings as those in steps S1506 and S1507 are executed.

As a preview display window, the same windows as the product application window shown in FIG. 13 may be used, as shown in FIGS. 19 or 20. Alternatively, processing for displaying a preview window separately prepared may be performed.

In step S1511, a determination is made on the basis of the printing instruction in step S1508 as to whether a group printer (group printer driver) has been designated. For this determination, the group printer 603 is inquired of whether the designated printer is one corresponding to a virtual printer on the basis of printer identification information such as a printer name, and a determination can be made according to information sent from the group printer 603 in reply to the inquiry.

If the result of determination in step S1511 is Yes, the process moves to step S1512. If the result of determination in step S1511 is No, the process moves to step S1513.

In step S1512, virtual printing processing such as distributed printing or color/monochromic distributed printing is executed by means of the electronic original despooler 105, the job control port monitor 621 (corresponding to the job control port monitor 110 in FIG. 11) and the logical port 710.

In step S1513, processing for throwing a job into the printer 107 shown in FIG. 11 is performed and outputting of a print using a conventional single device is performed.

Figure 16C:
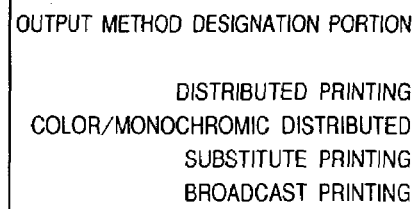

FIGS. 16A, 16B and 16C show information obtained in the above-described step 1503 or S1506. FIG. 16A corresponds to the page information portion in the printing instruction portion 10-a, FIG. 16B corresponds to the print format designation portion in the printing instruction portion 10-a and FIG. 16C corresponds to the output method designation portion in the printing instruction portion 10-a.

In the page information portion shown in FIG. 16A, the total number of pages 1602, the printing sheet size 1602 of each page and color flags 1603 and 1604 are set as page information in document data in a general-purpose format.

The color flags may be set on the basis of determination made when general-purpose document data is generated, as described below. For example, when general-purpose document data is generated by the electronic original writer 102, printing data from an application is examined to determine whether or not color information is contained in characters, graphics and images. If color information is contained, C (in indicating that color information exists) is set as a color flag with respect to the corresponding page. If no color information is contained, BW (monochrome) is set.

The print format designation portion shown in FIG. 16B corresponds to the information described in the description of the first embodiment. The number of pages (N) placed on one side, placement coordinates/a scaling ratio and page numbers are set in an area 1606.

The total number of physical sides 1607 represents the number of sides of printing sheets actually output. It coincides with the number of output print sheets in the case of one-sided printing. In a case where two sides are designated, odd numbers in numbers assigned to the sides indicate the front sides, while even numbers indicate the reverse sides.

An N-UP number can be designated with respect to each side. The number N of N-UP on each side determines the number of pages of general-purpose document data placed on the side.

Each side is set on the basis of information obtained by computing the position (placement position/scaling ratio) at which one of page numbers in general-purpose document data is placed according to the number N. A double-sided printing flag is set as a flag common to all side numbers. A method of designating a flag with respect to each side number may alternatively be used.

FIG. 16C corresponds to the output method designation portion in the printing instruction portion 10-a. In the output method designation portion, distribution proportions are set if distributed printing is set. A default setting of distribution proportions may be computed from the printing speeds of member computers or may be equal proportions. Distribution proportions themselves can be set on the group printer driver UI.

Figure 17:
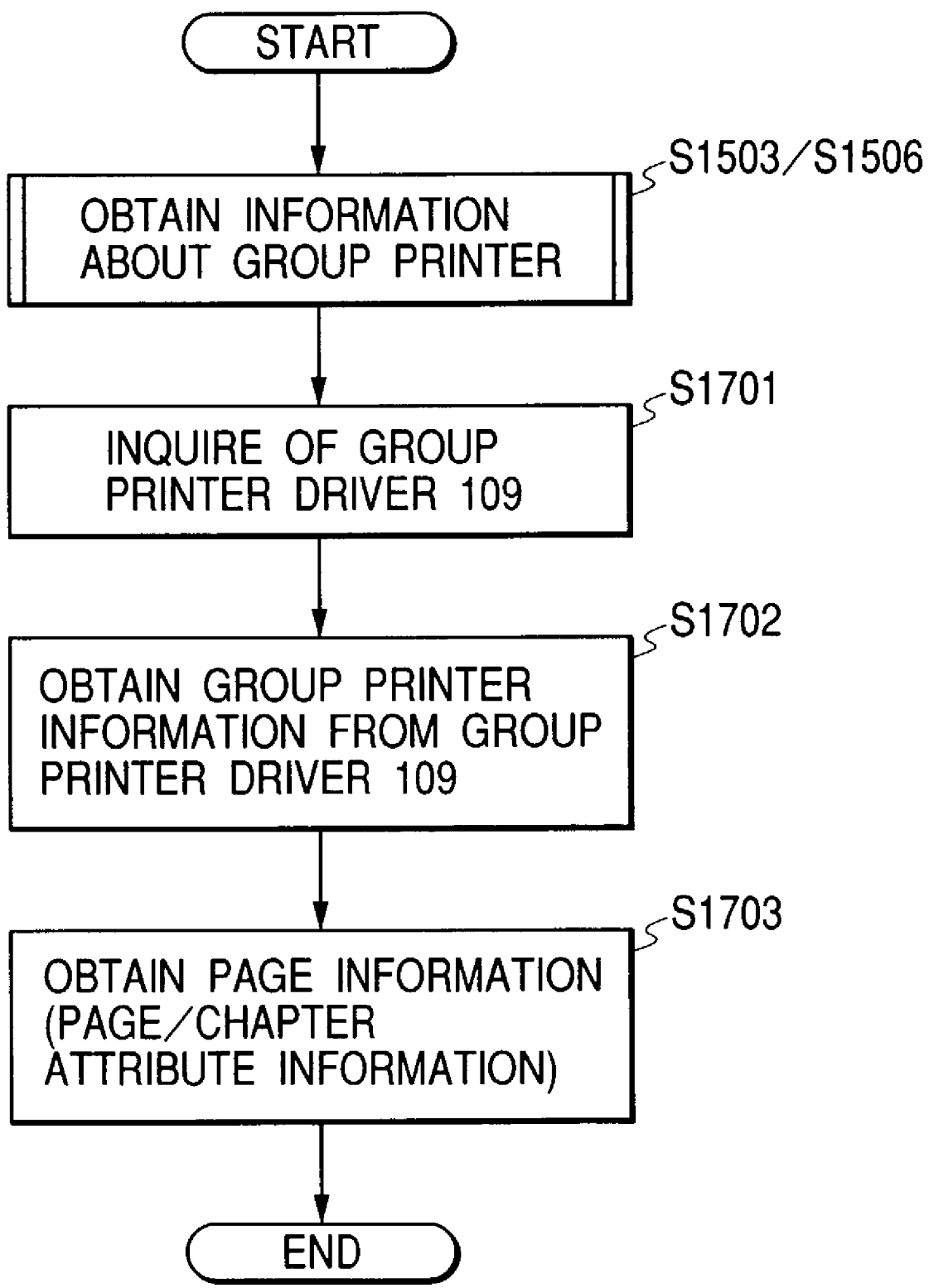
FIG. 17 is a flowchart showing details of processing operations shown in FIG. 5.

FIG. 17 shows details of processings in steps S1503 and S1506.

In step S1701, the bookbinding application 104 obtains, for the group printer driver 109, related information according to a group printer identified in step S1502 or step S1505 through a driver API relating to Devmode or extended Devmode. Determination as to whether or not the designated driver is for a group printer can be made by obtaining, from the above-mentioned API, identification information such as a flag agreed upon in advance between the bookbinding application and the group printer. Determination in the above-described step S1511 shown in FIG. 15 as to whether or not a group printer has been designated can also be made on the basis of this information.

In step S1702, group printer related information is obtained. Information obtained in this step is as shown in FIG. 10. Needless to say, the information described above with reference to FIGS. 16A, 16B and 16C are also included in this information.

Step S1703 is a step for obtaining information such as the page information portion and the print format designation portion relating to an output setting/format. This processing may be omitted in timing of step S1703.

FIGS. 18A and 18B show the selection windows to be displayed in the above-described steps S1506 and S1508, which windows are also an example of the user interface (printing setting windows) displayed on displays 207 of clients 102 to 104. FIGS. 18A and 18B can also be related to the printing setting window displayed in response to designation of "PRINT FORMAT (O)" described above with reference to FIG. 13 with respect to the first embodiment.

Reference 1801 shows a list of a plurality of printers selectable by clients 102 to 104. In the state shown in FIG. 18A, "printer E" is about to be selected from the printer list 1801. Presentation and setting of a selection list shown in FIG. 18B are performed in the same manner as those of the list shown in FIG. 18A.

In the printer list 1801, "printer C," for example, may represent a color printer. Also, each of "color/monochromic distributed printer" and "distributed group printer" represents a virtual printer for performing printing using a plurality of printers (member printers). For example, printers C and B (monochromic) or printers B and D (monochromic) may be registered in advance as member printers for "color/monochromic distributed printer" or "distributed group printer."

"Printer A" represents of a plurality of printers not related to printing processing such as distributed printing, broadcast printing or substitute printing. For example, if a port related to the printer is an LPR port 604, printing data transferred from a spooler 602 is sent to the device provided as an image forming apparatus by using an LPR (Line Printer Demon protocol). "Printer A" corresponds to the printer related to the printer driver 106 shown in FIG. 11.

Each of FIGS. 19 and 20 shows the state of a window displayed in the above-described step S1504, 1506, or 1510.

FIG. 19 shows a case where the output method for a printer identified in step S1502, 1505, or 1508 is capable of distributed printing.

Distributed printing comprises copy distribution printing for printing a plurality of copies by distributing the copies to a plurality of printers in certain proportions, and page distribution printing for printing by distributing a plurality of pages to a plurality of printers in certain proportions. An example of page distribution is illustrated with respect to this embodiment. As a method for selection between copy distribution and page distribution, a method may be used in which page distribution is selected if a designated number of copies is one, and in which copy distribution is selected if a designated number of copies is two or more.

In each of steps S1503, 1506 and 1510, the number of member printers, member printer names 1, 2, . . . , and information on distribution proportions set in the member printer driver setting information portions or the output method designation portion in the printing instruction portion 10-a are extracted, numbers of sides to be allotted to the member printers from the total number of sides are computed on the basis of the distribution proportions and the number of member printers obtained, and output conditions are discriminably displayed on the display window of the bookbinding application 104 on the basis of the results of this computation. Names of the assigned printers are also included in the output conditions.

Distribution proportions may be computed by the bookbinding application 104 on the basis of the printing speeds of the member printers based on the member printer driver setting information portions from the group printer driver. Alternatively, the results of computation of distribution proportions in the group printer driver may be obtained. In FIG. 19, a state in which outputs in proportions of 1:2 are distributed to the printers B and D is illustrated.

FIG. 20 shows a case where the group printer output method identified in the step S1502, S1505, or S1508 corresponds to a color/monochromic distribution.

A state is illustrated in which a color printer C is assigned for printing on sides with color flag C (indicating that color information exists) and a monochromic printer is assigned for printing on sides with color flag BW (monochrome).

As described above, in the printing job control system using a plurality of printers to perform printing processing for distributed printing, broadcast printing or substitute printing according to the second embodiment, the group printer selected as an output destination can be changed when a general-purpose printing file is stored and reused after being printed out. That is, in the printing job control system in which printing processing for distributed printing, broadcast printing or substitute printing using a plurality of printers is performed on a general-purpose printing file stored in a document management process, outputting of prints can be performed with flexibility by changing the output destination.

Also, changed details can be visually checked on the window for editing the general-purpose printing file.

Other Embodiments

The object of the present invention can also be attained by making a computer (or a CPU or an MPU) of a system or an apparatus read out and execute software program codes for realizing the functions of one of the above-described embodiments, which program codes are stored on a storage medium.

In this case, the program codes themselves read out from the storage medium realize the functions of one of the above-described embodiments, and the storage medium on which the program codes are stored constitutes the present invention.

For example, a floppy disk, a hard disk, an optical disk, an optical disk, a magneto-optical disk, a compact disc-read only memory (CD-ROM), a compact disc recordable (CD-R), a magnetic tape, a nonvolatile memory card, a read-only memory (ROM) or the like may be used as the storage medium for supplying the program codes.

Also, the present invention comprises not only realizing the functions of each of the above-described embodiments by making a computer execute the program codes read out, but also a case in which an operating system (OS) or the like running on a computer performs part or the whole of actual processing on the basis of the instruction of the program codes to realize the functions of each of the above-described embodiments.

Further, the present invention comprises a case in which the program codes read out from the storage medium are written to a memory provided on an expansion board inserted in a computer or an expansion unit connected to a computer, and a CPU or the like provided on the expansion board or the expansion unit performs part or the whole of actual processing on the basis of the instruction of the program codes to realize the functions of each of the above-described embodiments.

According to the present invention, as described above, document management is performed in printing data processing for distributed printing, substitute printing or the like using a plurality of printer devices and information including output destination information can be managed even in a case where a file once output is printed out afterwards under a certain condition, thereby realizing distributed printing, substitute printing or the like by simple operations without repeatingly requiring a user to a troublesome operation, e.g., an operation for setting an output destination.

Also, the group printer driver determines, when necessary, whether data thrown in according to printing instructions is a general-purpose printing file formed by an editing application, or drawing instructions from a general application and controls general-purpose document data and job tickets according to the determination, thereby efficiently linking the editing application and the printing system to increase the speed of the system at the time of outputting a print.

What is claimed is:

1. A computer-readable memory medium storing a computer-executable program for causing a computer to execute in a group printer driver a data processing method of processing a general printing file containing document data and printing instruction information, the printing instruction information including defined information defining a setting of a group printer related with a plurality of member printers, and of controlling a plurality of member printers based on the defined information of the plurality of member printers to execute a printing process via respective member printer drivers, the method comprising:

a determination step of, when a printing instruction is received from any one of a plurality of applications, determining whether the printing instruction is a printing instruction from a first application which can edit the general printing file by modifying the document data contained in the general printing file according to an editing instruction given by a user and which outputs the edited general printing file, or a printing instruction on the basis of a drawing instruction issued from a second application;

a first processing step of receiving the general printing file from the first application and of controlling the plurality of member printers via the respective member printer drivers to execute printing on the basis of the document data and printing instruction information contained in the general printing file from the first application without generating the document data and printing instruction information if it is determined in said determination step that the received printing instruction is the printing instruction from the first application; and a second processing step of generating document data and printing instruction information on the basis of the drawing instruction from the second application and controlling the plurality of member printers via the respective member printer drivers to execute printing on the basis of the generated document data and printing instruction information if it is determined in said determination step that the received printing instruction is the printing instruction from the second application.

2. The computer-readable memory medium storing a computer-executable program according to claim 1, wherein the editing includes adding a page or changing a page order.

3. The computer-readable memory medium storing a computer-executable program according to claim 1, wherein the general-purpose printing file is formed by archiving a file of the document data which can be edited by the first application and a file of the printing instruction information including an output destination printer.

4. An apparatus for executing in a group printer driver, processing a general printing file containing document data and printing instruction information, the printing instruction information including defined information defining a setting of a group printer related with a plurality of member printers, and of controlling a plurality of member printers based on defined information of the plurality of member printers to execute a printing process via respective member printer drivers the apparatus comprising:

determination means for, when a printing instruction is received from any one of a plurality of applications, determining whether the printing instruction is a printing instruction from a first application which can edit the general printing file by modifying the document data contained in the general printing file according to an editing instruction given by a user and which outputs the edited general printing file, or a printing instruction on the basis of a drawing instruction issued from a second application;

first processing means for receiving the general printing file from the first application and of controlling the plurality of member printers via the respective member printer drivers to execute printing on the basis of the document data and printing instruction information contained in the general printing file from the first application without generating the document data and printing instruction information if it is determined in said determination step that the received printing instruction is the printing instruction from the first application; and second processing means for generating document data and printing instruction information on the basis of the drawing instruction from the second application and controlling the plurality of member printers via the respective member printer drivers to execute printing on the basis of the generated document data and printing instruction information if it is determined in said determination step that the received printing instruction is the printing instruction from the second application.

5. A data processing method of processing a general printing file containing document data and printing instruction information, the printing instruction information including defined information defining a setting of a group printer related with a plurality of member printers, and of controlling a plurality of member printers based on defined information of the plurality of member printers to execute a printing process via respective member printer drivers, the method comprising:

a determination step of, when a printing instruction is received from any one of a plurality of applications, determining whether the printing instruction is a printing instruction from a first application which can edit the general printing file by modifying the document data contained in the general printing file according to an editing instruction given by a user and which outputs the edited general printing file, or a printing instruction on the basis of a drawing instruction issued from a second application;

a first processing step of receiving the general printing file from the first application and of controlling the plurality of member printers via the respective member printer drives to execute printing on the basis of the document data and printing instruction information contained in the general printing file from the first application without generating the document data and printing instruction information if it is determined in said determination step that the received printing instruction is the printing instruction from the first application; and a second processing step of generating document data and printing instruction information on the basis of the drawing instruction from the second application and controlling the plurality of member printers via the respective member printer drivers to execute printing on the basis of the generated document data and printing instruction information if it is determined in said determination step that the received printing instruction is the printing instruction from the second application.

6. The method according to claim 5, wherein the editing includes adding a page or changing a page order.

7. The method according to claim 5, wherein the general-purpose printing file is formed by archiving a file of the document data which can be edited by the first application and a file of the printing instruction information including an output destination printer.

* * * * *